（12) United States Patent
Keefer et al.

(10) Patent No.: US 7,087,331 B2
(45) Date of Patent: Aug. 8, 2006

(54) ENERGY EFFICIENT GAS SEPARATION FOR FUEL CELLS

(75) Inventors: Bowie G. Keefer, Vancouver (CA); Denis J. Connor, West Vancouver (CA); Carl F. Hunter, West Vancouver (CA)

(73) Assignee: QuestAir Technologies Inc., Burnaby (CA)

( * ) Notice: Subject to any disclaimer, the term of this patent is extended or adjusted under 35 U.S.C. 154(b) by 455 days.

(21) Appl. No.: 10/039,940

(22) Filed: Oct. 26, 2001

(65) Prior Publication Data
US 2002/0142208 A1 Oct. 3, 2002

Related U.S. Application Data
(60) Provisional application No. 60/323,169, filed on Sep. 17, 2001.

(30) Foreign Application Priority Data
Oct. 30, 2000 (CA) ............................................. 2325072

(51) Int. Cl.
*H01M 8/04* (2006.01)
*H01M 8/06* (2006.01)

(52) U.S. Cl. ............................. 429/17; 429/19; 429/26; 429/34

(58) Field of Classification Search ................... 429/17, 429/19, 20, 26, 34
See application file for complete search history.

(56) References Cited
U.S. PATENT DOCUMENTS

| | | | |
|---|---|---|---|
| 3,094,569 A | 6/1963 | Thomas | |
| 3,204,388 A | 9/1965 | Asker | |
| 3,513,631 A | 12/1968 | Seibert et al. | |
| 3,430,418 A | 3/1969 | Wagner | |
| 3,594,984 A | 7/1971 | Toyama | |
| 3,847,672 A | 11/1974 | Trocciola et al. | |
| 3,865,924 A | 2/1975 | Gidaspow et al. | |
| 4,019,879 A | 4/1977 | Rabo et al. | |
| 4,144,037 A | 3/1979 | Armond et al. | |
| 4,153,434 A | 5/1979 | Settlemyer | |
| 4,200,682 A | 4/1980 | Sederquist | |
| 4,272,265 A | 6/1981 | Snyder | |
| 4,322,394 A | 3/1982 | Mezey et al. | |
| 4,354,859 A | 10/1982 | Keller, II et al. | |

(Continued)

FOREIGN PATENT DOCUMENTS

| CA | 2109055 | 2/1938 |
|---|---|---|
| CA | 1256038 | 6/1989 |
| CA | 2016045 | 8/1994 |

(Continued)

OTHER PUBLICATIONS

U.S. patent application Ser. No. 09/808,715, Keefer et al., filed Mar. 2001.
U.S. patent application Ser. No. 10/039,552, Keefer et al., filed Oct. 2001.

(Continued)

*Primary Examiner*—Stephen J. Kalafut
(74) *Attorney, Agent, or Firm*—Klarquist Sparkman, LLP

(57) ABSTRACT

An electrical current generating system is disclosed that includes a fuel cell operating at a temperature of at least about 250° C. (for example, a molten carbonate fuel cell or a solid oxide fuel cell), a hydrogen gas separation system or oxygen gas delivery system that includes a compressor or pump, and a drive system for the compressor or pump that includes means for recovering energy from at least one of the hydrogen gas separation system, oxygen gas delivery system, or heat of the fuel cell. The drive system could be a gas turbine system. The hydrogen gas separation system or the oxygen gas delivery system may include a pressure swing adsorption module.

92 Claims, 16 Drawing Sheets

U.S. PATENT DOCUMENTS

| | | |
|---|---|---|
| 4,406,675 A | 9/1983 | Dangieri et al. |
| 4,452,612 A | 6/1984 | Mattia |
| 4,530,705 A | 7/1985 | Firey |
| 4,532,192 A | 7/1985 | Baker et al. |
| 4,553,981 A | 11/1985 | Fuderer |
| 4,555,453 A | 11/1985 | Appleby |
| 4,578,214 A | 3/1986 | Jungerhans |
| 3,564,816 A | 5/1986 | Batta |
| 4,587,114 A | 5/1986 | Hirai et al. |
| 4,595,642 A | 6/1986 | Nakanishi et al. |
| 4,696,682 A | 9/1987 | Hirai et al. |
| 4,702,903 A | 10/1987 | Keefer |
| 4,726,816 A | 2/1988 | Fuderer |
| 4,743,276 A | 5/1988 | Nishida et al. |
| 4,758,253 A | 7/1988 | Davidson et al. |
| 4,759,997 A | 7/1988 | Ohyauchi et al. |
| 4,781,735 A | 11/1988 | Tagawa et al. |
| 4,783,433 A | 11/1988 | Tajima et al. |
| 4,790,858 A | 12/1988 | Sircar |
| 4,801,308 A | 1/1989 | Keefer |
| 4,816,121 A | 3/1989 | Keefer |
| 4,914,076 A | 4/1990 | Tsuji et al. |
| 4,917,711 A | 4/1990 | Xie et al. |
| 4,963,339 A | 10/1990 | Krishnamurthy et al. |
| 4,968,329 A | 11/1990 | Keefer |
| 4,969,935 A | 11/1990 | Hay |
| 4,988,580 A | 1/1991 | Ohsaki et al. |
| 4,994,331 A | 2/1991 | Cohen |
| 5,068,159 A | 11/1991 | Kinoshita |
| 5,079,103 A | 1/1992 | Schramm |
| 5,082,473 A | 1/1992 | Keefer |
| 5,096,469 A | 3/1992 | Keefer |
| 5,096,470 A | 3/1992 | Krishnamurthy |
| 5,126,310 A | 6/1992 | Golden et al. |
| 5,133,784 A | 7/1992 | Boudet et al. |
| 5,147,735 A * | 9/1992 | Ippommatsu et al. ......... 429/17 |
| 5,175,061 A | 12/1992 | Hildebrandt et al. |
| 5,227,598 A | 7/1993 | Woodmansee et al. |
| 5,245,110 A | 9/1993 | Van Dijk et al. |
| 5,246,676 A | 9/1993 | Hay |
| 5,248,325 A | 9/1993 | Kagimoto et al. |
| 5,256,172 A | 10/1993 | Keefer |
| 5,256,174 A | 10/1993 | Kai et al. |
| 5,258,571 A | 11/1993 | Golden et al. |
| 5,271,916 A | 12/1993 | Vanderborgh et al. |
| 5,282,886 A | 2/1994 | Kobayashi et al. |
| 5,328,503 A | 7/1994 | Kumar |
| 5,360,679 A | 11/1994 | Buswell et al. |
| 5,366,818 A | 11/1994 | Wilkinson et al. |
| 5,393,326 A | 2/1995 | Engler et al. |
| 5,411,578 A | 5/1995 | Watson et al. |
| 5,415,748 A | 5/1995 | Emiliani et al. |
| 5,429,665 A | 7/1995 | Botich |
| 5,431,716 A | 7/1995 | Ebbeson |
| 5,434,016 A | 7/1995 | Benz et al. |
| 5,441,559 A | 8/1995 | Petit et al. |
| 5,487,775 A | 1/1996 | LaCava et al. |
| 5,509,956 A | 4/1996 | Opperman et al. |
| 5,523,326 A | 6/1996 | Dandekar et al. |
| 5,529,763 A | 6/1996 | Peng et al. |
| 5,529,970 A | 6/1996 | Peng |
| 5,531,809 A | 7/1996 | Golden et al. |
| 5,543,238 A | 8/1996 | Strasser |
| 5,593,478 A | 1/1997 | Hill et al. |
| 5,604,047 A | 2/1997 | Bellows et al. |
| 5,632,807 A | 5/1997 | Tomita et al. |
| 5,645,950 A * | 7/1997 | Benz et al. ................ 429/17 X |
| 5,646,305 A | 7/1997 | Wagner et al. |
| 5,656,067 A | 8/1997 | Watson et al. |
| 5,658,370 A | 8/1997 | Vigor et al. |
| 5,711,926 A | 1/1998 | Knaebel |
| 5,714,276 A | 2/1998 | Okamoto |
| 5,766,311 A | 6/1998 | Ackley et al. |
| 5,811,201 A | 9/1998 | Skowronski |
| 5,827,358 A | 10/1998 | Kulish et al. |
| 5,876,486 A | 3/1999 | Steinwandel et al. |
| 5,891,217 A | 4/1999 | Lemcoff et al. |
| 5,900,329 A | 5/1999 | Reiter et al. |
| 5,917,136 A | 6/1999 | Gaffney et al. |
| 5,925,322 A | 7/1999 | Werth |
| 5,955,039 A | 9/1999 | Dowdy |
| 5,958,109 A | 9/1999 | Fuderer |
| 5,968,680 A * | 10/1999 | Wolfe et al. ............... 429/17 X |
| 5,980,857 A | 11/1999 | Kapoor et al. |
| 5,981,096 A | 11/1999 | Horburg et al. |
| 5,998,056 A | 12/1999 | Divisek et al. |
| 6,022,399 A | 2/2000 | Ertl et al. |
| 6,045,933 A | 4/2000 | Okamoto |
| 6,051,050 A | 4/2000 | Keefer et al. |
| 6,056,804 A | 5/2000 | Keefer et al. |
| 6,060,032 A | 5/2000 | Hable et al. |
| 6,063,161 A | 5/2000 | Keefer et al. |
| 6,077,620 A * | 6/2000 | Pettit .......................... 429/26 |
| 6,090,312 A | 7/2000 | Ziaka et al. |
| 6,143,057 A | 11/2000 | Bulow et al. |
| 6,162,558 A | 12/2000 | Borup et al. |
| 6,176,897 B1 | 1/2001 | Keefer |
| 6,190,623 B1 | 2/2001 | Sanger et al. |
| 6,190,791 B1 | 2/2001 | Hornburg |
| 6,200,365 B1 | 3/2001 | Eimer et al. |
| 6,210,822 B1 | 4/2001 | Abersfelder et al. |
| 6,231,644 B1 | 5/2001 | Jain et al. |
| 6,255,010 B1 * | 7/2001 | George et al. ............. 429/17 X |
| 6,283,723 B1 | 9/2001 | Milburn et al. |
| 6,293,998 B1 | 9/2001 | Dolan et al. |
| 6,296,823 B1 | 10/2001 | Ertl et al. |
| 6,312,843 B1 | 11/2001 | Kimbara et al. |
| 6,358,300 B1 * | 3/2002 | Fornof et al. ................ 95/91 |
| 6,398,853 B1 | 6/2002 | Keefer et al. |
| 6,406,523 B1 | 6/2002 | Connor et al. |
| 6,428,915 B1 * | 8/2002 | Ban et al. ................. 429/17 X |
| 6,607,854 B1 * | 8/2003 | Rehg et al. ............... 429/17 X |
| 6,667,128 B1 * | 12/2003 | Edlund ....................... 429/46 |
| 6,692,545 B1 | 2/2004 | Gittleman et al. |
| 2001/0047824 A1 | 12/2001 | Hill et al. |
| 2002/0004157 A1 | 1/2002 | Keefer et al. |
| 2002/0098394 A1 | 7/2002 | Keefer et al. |
| 2002/0104518 A1 | 8/2002 | Keefer et al. |
| 2002/0110503 A1 | 8/2002 | Gittleman et al. |
| 2002/0110504 A1 | 8/2002 | Gittleman et al. |
| 2002/0112479 A1 | 8/2002 | Keefer et al. |
| 2002/0127442 A1 | 9/2002 | Connor et al. |
| 2002/0142198 A1 | 10/2002 | Towler et al. |
| 2002/0142208 A1 | 10/2002 | Keefer et al. |
| 2003/0143448 A1 | 7/2003 | Keefer |
| 2003/0157390 A1 | 8/2003 | Keefer |
| 2004/0005492 A1 | 1/2004 | Keefer et al. |

FOREIGN PATENT DOCUMENTS

| | | |
|---|---|---|
| CA | 2087972 | 1/2000 |
| CA | 2087973 | 1/2001 |
| DE | 3913581 A1 | 11/1990 |
| EP | 0 143 537 B1 | 5/1985 |
| EP | 0 143 537 A2 | 5/1985 |
| EP | 0 341 189 A1 | 8/1989 |
| EP | 345908 * | 12/1989 |
| EP | 0 143 537 | 3/1990 |
| EP | 0 681 860 A2 | 7/1996 |
| EP | 0 691 701 A1 | 10/1996 |
| EP | 0 737 648 A2 | 10/1996 |
| EP | 0 750 361 A1 | 12/1996 |

| | | |
|---|---|---|
| EP | 0 751 045 | 1/1997 |
| EP | 0 853 967 A2 | 7/1998 |
| EP | 1 070 531 A2 | 1/2001 |
| EP | 1072772 * | 1/2001 |
| EP | 1 095 689 A1 | 5/2001 |
| GB | 2 042 365 A | 9/1980 |
| JP | 59075574 A | 4/1984 |
| JP | 62-278770 | 3/1987 |
| JP | 62-274561 * | 11/1987 |
| JP | 63-166157 * | 7/1988 |
| JP | 63228572 | 9/1988 |
| JP | 04206161 | 7/1992 |
| JP | 05166528 | 7/1993 |
| JP | 05-166528 | 7/1993 |
| JP | 07094200 | 7/1995 |
| JP | 8045526 A2 | 2/1996 |
| JP | 10027621 | 1/1998 |
| JP | 63034862 | 2/1998 |
| JP | WO 98/29182 | 7/1998 |
| JP | 10325360 A | 12/1998 |
| JP | 11214021 A2 | 8/1999 |
| WO | WO 94/04249 | 3/1994 |
| WO | WO 96/13871 | 5/1996 |
| WO | WO 99/19249 | 4/1999 |
| WO | WO 99/28013 | 6/1999 |
| WO | WO 99/46032 | 9/1999 |
| WO | WO 00/16425 | 3/2000 |
| WO | WO 00/16880 | 3/2000 |
| WO | WO 00/76630 | 12/2000 |
| WO | WO 01/47050 | 6/2001 |
| WO | WO 02/24309 | 3/2002 |
| WO | WO 02/35623 | 5/2002 |
| WO | WO 02/37590 | 5/2002 |
| WO | WO 02/45821 | 6/2002 |
| WO | WO 02/47797 | 6/2002 |
| WO | WO 02/056400 | 7/2002 |

OTHER PUBLICATIONS

Vaporciyan and Kadiec, "Periodic Separating Reactors: Experiments and Theory," *AIChE Journal* 35, pp. 831–844 (1989), 1 Day.

Chatsiriwech et al., "Enhancement of Catalytic Reaction by Pressure Swing Adsorption," *Catalysis Today* 20, Elsevier Science, pp. 351–366 (1994), month unknown.

Hufton et al., "Sorption Enhanced Reaction Process for Hydrogen Production," *AIChE Journal*, vol. 45, No. 2, 248–256 (Feb. 1999).

"Fuel Cells For Transportation 98," National Laboratory Annual Progress Report (1998), U.S. Department of Energy, Office of Advanced Automotive Technologies, "CO Clean–up R&D", Argonne National Laboratory, pp. 33–36, Nov.

English translation of JP 5–166,528 (Jul. 1993).*

Carvill et al., *AIChE J.* 42(10):2765, 1996 (Oct.).

Ding et al., *Chemical Engineering Science* 55:3461–3474, 2000 (month unknown).

Ding et al., *Chemical Engineering Science* 55:3929–3940, 2000 (month unknown).

Hufton et al., *AIChE J.* 45(2):248, 1999 (Feb.).

Iyuke et al., *Chemical Engineering Science* 55:4745–4755, 2000 (month unknown).

* cited by examiner

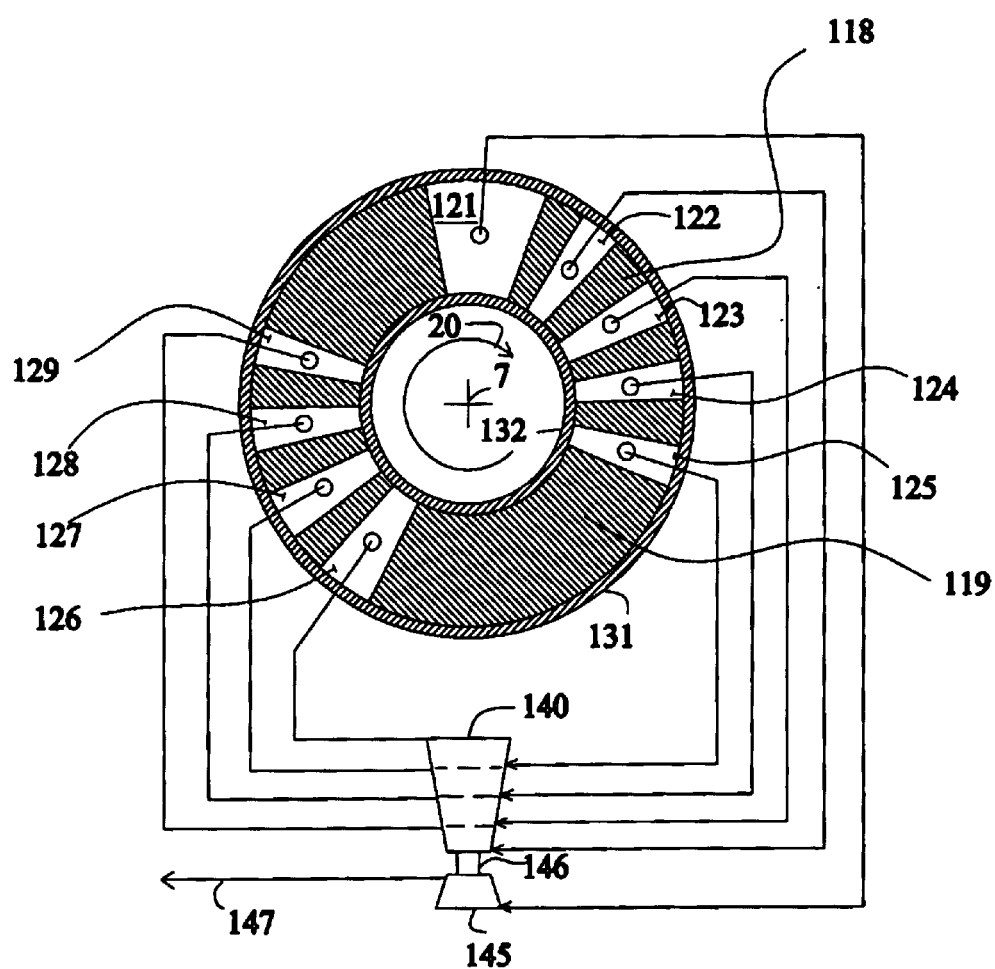

ENERGY EFFICIENT GAS SEPARATION FOR FUEL CELLS

CROSS REFERENCE TO RELATED APPLICATION

This application claims the benefit of Canadian Patent Application No. 2,325,072, filed Oct. 30, 2000, and U.S. Provisional Application No. 60/323,169, filed Sep. 17, 2001, the disclosures of which are incorporated herein by reference.

The present disclosure relates to a fuel cell-based electrical generation system, which employs pressure swing adsorption for enhancing the energy efficiency of fuel cells, particularly high temperature fuel cells such as molten carbonate and solid oxide fuel cells.

BACKGROUND

Fuel cells provide an environmentally friendly source of electrical current. One type of high temperature fuel cell used for generating electrical power, particularly envisaged for larger scale stationary power generation, is the molten carbonate fuel cell (MCFC). The MCFC includes an anode channel for receiving a flow of hydrogen gas (or a fuel gas which reacts in the anode channel to generate hydrogen by steam reforming and water gas shift reactions), a cathode channel for receiving a flow of oxygen gas, and a porous matrix containing a molten carbonate electrolyte which separates the anode channel from the cathode channel. Oxygen and carbon dioxide in the cathode channel react to form carbonate ions, which cross the electrolyte to react with hydrogen in the anode channel to generate a flow of electrons. As the hydrogen is consumed, carbon monoxide is shifted by steam to generate additional hydrogen. Carbon dioxide and water vapor are produced in the anode channel by oxidation of fuel components, and by reduction of carbonate ions from the electrolyte. Typical operating temperature of molten carbonate fuel cells is about 600° to about 650° C.

Another type of high temperature fuel cell is the solid oxide fuel cell (SOFC). The SOFC includes an anode channel for receiving a flow of hydrogen gas (or a fuel gas which reacts in the anode channel to generate hydrogen by steam reforming and water gas shift reactions), a cathode channel for receiving a flow of oxygen gas, and a solid electrolyte which is a ceramic membrane conductive to oxygen ions and separates the anode channel from the cathode channel. Oxygen in the cathode channel dissociates to oxygen ions, which cross the electrolyte to react with hydrogen in the anode channel to generate a flow of electrons. As the hydrogen is consumed, carbon monoxide may be oxidized directly or may be shifted by steam to generate additional hydrogen. Carbon dioxide and water vapor are produced in the anode channel by oxidation of fuel components. Typical operating temperature of solid oxide fuel cells is about 500° to about 1000° C.

Except in the rare instance that hydrogen (e.g. recovered from refinery or chemical process off-gases, or else generated from renewable energy by electrolysis of water) is directly available as fuel, hydrogen must be generated from fossil fuels by an appropriate fuel processing system. For stationary power generation, it is preferred to generate hydrogen from natural gas by steam reforming or partial oxidation to produce "syngas" comprising a mixture of hydrogen, carbon monoxide, carbon dioxide, steam and some unreacted methane. As hydrogen is consumed in the fuel cell anode channel, much of the carbon monoxide reacts with steam by water gas shift to generate more hydrogen and more carbon dioxide. Other carbonaceous feedstocks (e.g. heavier hydrocarbons, coal, or biomass) may also be reacted with oxygen and steam to generate syngas by partial oxidation, gasification or autothermal reforming. The fuel cell may also be operated on hydrogen or syngas that has been generated externally.

A great advantage of MCFC and SOFC systems is that their high operating temperature facilitates close thermal integration between the fuel cell and the fuel processing system. The high temperature also allows the elimination of noble metal catalysts required by lower temperature fuel cells.

Prior art MCFC systems have serious limitations associated with their high temperature operation, and with their inherent need to supply carbon dioxide to the cathode while removing it from the anode. Prior art SOFC systems face even more challenging temperature regimes, and are disadvantaged by the degradation of cell voltages at very high temperatures under conventional operating conditions.

The lower heat of combustion of a fuel usefully defines the energy (enthalpy change of the reaction) that may be generated by oxidizing that fuel. The electrochemical energy that can be generated by an ideal fuel cell is however the free energy change of the reaction, which is smaller than the enthalpy change. The difference between the enthalpy change and the free energy change is the product of the entropy change of the reaction multiplied by the absolute temperature. This difference widens at higher temperatures, so higher temperature fuel cells inherently convert a lower fraction of the fuel energy to electrical power at high efficiency, while a larger fraction of the fuel energy is available only as heat which must be converted to electrical power by a thermodynamic bottoming cycle (e.g. steam or gas turbine plant) at lower efficiency.

Accumulation of reaction products (carbon dioxide and steam) on the fuel cell anode opposes the electrochemical reaction, so that the free energy is reduced. Higher partial pressure of oxygen and carbon dioxide over the cathode, and higher partial pressure of hydrogen over the anode, drive the reaction forward so that the free energy is increased. Unfortunately, the reaction depletes the oxygen and carbon dioxide in the cathode channel and depletes hydrogen in the anode channel while rapidly increasing the backpressure of carbon dioxide in the anode channel. Hence the free energy change is reduced, directly reducing the cell voltage of the fuel stack. This degrades the electrical efficiency of the system, while increasing the heat that must be converted at already lower efficiency by the thermal bottoming cycle.

The free energy change is simply the product of the electromotive force ("E") of the cell and the charge transferred per mole by the reaction ("2F"), where the factor of two reflects the valency of the carbonate ion. The following Nernst relation for a MCFC expresses the above described sensitivity of the electromotive force to the partial pressures of the electrochemical reactants in the anode and cathode channels, where the standard electromotive force ("$E_o$") is referred to all components at standard conditions and with water as vapor.

$$E = E_o - \frac{RT}{2F} \ln\left[\frac{P_{H2O(anode)} \cdot P_{CO2(anode)}}{P_{H2(anode)} \cdot P_{O2(cathode)}^{0.5} \cdot P_{CO2(cathode)}}\right]$$

Prior art MCFC systems do not provide any satisfactory solution for this problem which gravely compromises attainable overall efficiency. The challenge is to devise a method for sustaining high hydrogen concentration over the anode and high oxygen concentration over the cathode, while efficiently transferring hot carbon dioxide from the anode to the cathode. Despite repeated attempts to devise an effective carbon dioxide transfer technology that would be compatible with MCFC operating conditions, no such attempt has been adequately successful.

The accepted method for supplying carbon dioxide to the MCFC cathode has been to burn a fraction of the anode exhaust gas (including unreacted hydrogen and other fuel components) to provide carbon dioxide mixed with steam and nitrogen to be mixed with additional air providing oxygen to the cathode. This approach has serious limitations. Even more of the original fuel value is unavailable for relatively efficient electrochemical power generation, in view of additional combustion whose heat can only be absorbed usefully by the thermal bottoming cycle. Also, the oxygen/nitrogen ratio of the cathode gas is even more dilute than ambient air, further reducing cell voltage and hence transferring more power generation load less efficiently onto the thermal bottoming plant.

The following Nernst relation for a SOFC expresses the sensitivity of the electromotive force to the partial pressures of the electrochemical reactants in the anode and cathode channels, with the simplifying assumption that CO is converted by the water gas shift reaction. This sensitivity is of course greatest at the highest working temperatures of SOFC.

$$E = E_o - \frac{RT}{2F} \ln\left[\frac{P_{H2O(anode)}}{P_{H2(anode)} \cdot P^{0.5}_{O2(cathode)}}\right]$$

Pressure swing adsorption (PSA) systems are one possibility for providing fuel gases to a fuel cell. PSA systems and vacuum pressure swing adsorption systems (VPSA) separate gas fractions from a gas mixture by coordinating pressure cycling and flow reversals over an adsorber or adsorbent bed which preferentially adsorbs a more readily adsorbed gas component relative to a less readily adsorbed gas component of the mixture. The total pressure of the gas mixture in the adsorber is elevated while the gas mixture is flowing through the adsorber from a first end to a second end thereof, and is reduced while the gas mixture is flowing through the adsorbent from the second end back to the first end. As the PSA cycle is repeated, the less readily adsorbed component is concentrated adjacent the second end of the adsorber, while the more readily adsorbed component is concentrated adjacent the first end of the adsorber. As a result, a "light" product (a gas fraction depleted in the more readily adsorbed component and enriched in the less readily adsorbed component) is delivered from the second end of the adsorber, and a "heavy" product (a gas fraction enriched in the more strongly adsorbed component) is exhausted from the first end of the adsorber.

However, the conventional system for implementing pressure swing adsorption or vacuum pressure swing adsorption uses two or more stationary adsorbers in parallel, with multiple two-way directional valves at each end of each adsorber to connect the adsorbers in alternating sequence to pressure sources and sinks. This system is often cumbersome and expensive to implement due to the large size of the adsorbers and the complexity of the valving required. The valves would not be capable of operation at MCFC working temperatures. Further, the conventional PSA system makes inefficient use of applied energy because of irreversible gas expansion steps as adsorbers are cyclically pressurized and depressurized within the PSA process. Conventional PSA systems are bulky and heavy because of their low cycle frequency and consequent large adsorbent inventory. In addition, prior art PSA technology may not be capable of operation at such high temperature. Also, adsorbents which can separate carbon dioxide in the presence of steam must be provided for any anode gas PSA separation working at elevated temperature.

Combined cycle power plants with a gas turbine cycle integrated with a fuel cell system have been disclosed. In addition, commonly-assigned PCT Published International Patent Application No. WO 00/16425 provides examples of how PSA units may be integrated with gas turbine power plants, or with fuel cell power plants having a gas turbine auxiliary engine.

A further need addressed by the disclosed systems and processes is for mitigation of global warming driven by cumulative emissions of carbon dioxide from fossil-fuelled power generation.

The disclosed systems and processes also address the following environmental needs:

A. concentrated $CO_2$ delivered for disposal or sequestration.

B. substantially complete elimination of NOx emissions by complete elimination of combustion in the presence of nitrogen.

C. high overall efficiency to achieve most sustainable use of energy resources.

SUMMARY OF THE DISCLOSURE

The disclosed MCFC or SOFC based electrical generation systems address the deficiencies of the prior art, in general to manipulate reactant concentrations for enhanced performance and economics, and in MCFC systems to transfer carbon dioxide from the anode to the cathode while enhancing electrical power output.

According to a first embodiment of the disclosed systems and processes, there is provided an electrical current generating system that includes at least one fuel cell operating at a temperature of at least about 250° C., a hydrogen gas separation system and/or oxygen gas delivery system that includes at least one device selected from a compressor or vacuum pump, and a drive system for the device that includes means for recovering energy from at least one of the hydrogen gas separation system, oxygen gas delivery system, or heat of the fuel cell. According to a second embodiment of an electrical current generating system that also includes a high temperature fuel cell, a gas turbine system may be coupled to the hydrogen gas separation system or oxygen gas delivery system, wherein the gas turbine system is powered by energy recovered from at least one of the hydrogen gas separation system, oxygen gas delivery system, or heat of the fuel cell. The hydrogen gas separation system or the oxygen gas delivery system may include a pressure swing adsorption module. These generating systems are particularly useful with molten carbonate fuel cells and solid oxide fuel cells.

The energy recovery means may include a gas turbine and/or a heat exchanger that receives a heated and/or pressurized gas stream from the hydrogen gas separation system, oxygen gas delivery system, or fuel cell. For example, a fuel cell heat recovery system may be coupled to the fuel cell and to the gas turbine system (in this case, a hydrogen gas separation system is optional). The energy recovery means translates the recovered energy into a drive force for operating the compressor and vacuum pump. For example, a pressure swing adsorption module could establish a pressure gradient in a fuel-containing gas stream under conditions sufficient for separating the fuel-containing gas stream into a fuel-enriched gas stream and a fuel-depleted gas stream, and at least one of the fuel-enriched gas stream or fuel-depleted gas stream is recirculated to a gas turbine system coupled to a compressor and/or vacuum pump to capture the recirculation stream's energy. Another example is a fuel cell heat recovery system that transfers heat from the fuel cell to a heat recovery working fluid that can undergo expansion to power the gas turbine system.

The gas turbine system coupled to the PSA may power all compressors and vacuum pumps for the O2 PSA, along with vacuum pump and/or heavy reflux compression for the H2 PSA. This auxiliary gas turbine cycle allows a heavy reflux vacuum pump and compressor to be driven by the turboexpander which expands the products of hydrogen PSA tail gas combustion. A feature of certain disclosed embodiments is integration of vacuum pump(s) and/or compressors with the gas turbine powered directly or indirectly by tail gas combustion or indirectly by heat exchange to fuel cell stack waste heat. Thus, neither an electrical generator coupled to the thermal bottoming cycle nor an auxiliary power source is required to power all the compressors and vacuum pumps for the gas separation systems. The gas turbine system may also be coupled to an auxiliary device such as an electrical current generator that could provide power to a vehicle air conditioning system. Either single or multiple spool gas turbine configurations may be considered. Centrifugal or axial machines may be used as the compressors and pumps. Approaches based on integration of gas turbines and fuel cells are particularly favorable for larger power levels. Free spool gas generators (e.g. turbochargers) are used in some economically preferred embodiments.

Thus, there are provided advanced MCFC and SOFC systems incorporating a pressure swing adsorption (PSA) and integrated gas turbine system to enrich hydrogen over the anode while rapidly separating carbon dioxide (to the cathode for MCFC systems). In certain systems, the hydrogen PSA system will operate at high temperatures even approaching that of the MCFC system.

In one variant of the first or second embodiments described above, the electrical current generating system comprises a MCFC or SOFC fuel cell, an oxygen gas delivery system, and/or a hydrogen gas delivery system. The fuel cell can include an anode channel having an anode gas inlet for receiving a supply of hydrogen gas (or a fuel gas which reacts to form hydrogen in the anode channel), a cathode channel having a cathode gas inlet and a cathode gas outlet, and an electrolyte in communication with the anode and cathode channel for facilitating ion transport between the anode and cathode channel. The hydrogen gas delivery system may include a hydrogen PSA system, including a rotary module having a stator and a rotor rotatable relative to the stator, for enriching hydrogen to the anode channel and extracting carbon dioxide therefrom. In some embodiments, the electrical current generating system also includes a PSA or VPSA system for enriching oxygen from air for supply to the cathode channel and/or to the fuel processing system. The PSA unit for enriching hydrogen and separating carbon dioxide will be referred to as the first PSA unit, while a second PSA or VPSA unit may be provided for oxygen enrichment.

The rotor of a PSA unit for use in the disclosed systems and processes includes a number of flow paths for receiving adsorbent material therein for preferentially adsorbing a first gas component in response to increasing pressure in the flow paths relative to a second gas component. The pressure swing adsorption system also may include compression machinery coupled to the rotary module for facilitating gas flow through the flow paths for separating the first gas component from the second gas component. The stator includes a first stator valve surface, a second stator valve surface, and plurality of function compartments opening into the stator valve surfaces. The function compartments include a gas feed compartment, a light reflux exit compartment and a light reflux return compartment.

The hydrogen PSA system may itself operate at a working high temperature. For example, the operating temperature of the adsorbers in the first or hydrogen PSA unit may range from approximately ambient temperature to an elevated temperature up to about 450° C., as may be facilitated by recuperative or regenerative heat exchange between the first PSA unit and the fuel cell anode channel. According to another variation, the operating temperature of the adsorbers may range from about the operating temperature of the MCFC stack (e.g., about 600 to about 650° C.) or SOFC stack (e.g., about 500 to about 1000° C.) down to about 450° C., as may be facilitated by recuperative or regenerative heat exchange. In particular embodiments, the operating temperature of the hydrogen PSA adsorbers may range from ambient to about 800° C., especially about 150° C. to about 800° C. for PSA units that contain catalysts and ambient to 200° C. for PSA units that do not contain catalysts. This PSA unit may be configured to support a temperature gradient along the length of the flow channels, so that the temperature at the second end of the adsorbers is higher than the temperature at the first end of the adsorbers. As used herein, "operating temperature of the adsorbers" denotes the temperature of a gas flowing through the adsorbers and/or the temperature of the adsorber beds.

According to a third embodiment, there is disclosed an electrical current generating system that includes a MCFC or SOFC, and a H2 PSA coupled to the MCFC or SOFC, wherein the H2 PSA includes a first adsorbent and at least one second material selected from a second adsorbent and a steam reforming catalyst or water gas shift reaction catalyst. The first adsorbent is chemically distinct from the second adsorbent. For example, the adsorbent in the adsorbers of the first or hydrogen PSA may include a first zone of adsorbent, which is selective at an elevated operating temperature (e.g., about 250° C. to about 800° C.) for carbon dioxide in preference to water vapor. Suitable such adsorbents known in the art include alkali-promoted materials. Illustrative alkali-promoted materials include those containing cations of alkali metals such as Li, Na, K, Cs, Rb, and/or alkaline earth metals such as Ca, St, and Ba. The materials typically may be provided as the hydroxide, carbonate, bicarbonate, acetate, phosphate, nitrate or organic acid salt compound of the alkali or alkaline earth metals. Such compounds may be deposited on any suitable substrate such as alumina. Examples of specific materials include alumina impregnated with potassium carbonate and hydrotalcite promoted with potassium carbonate. For embodiments of the first PSA unit operating at temperatures closer to ambient, suitable adsorbents include alumina gel, activated carbons, hydrophilic zeolites (e.g. type 13X zeolite and many other zeolites known in the art), and hydrophobic zeolites (e.g. type Y zeolite or silicalite).

In high temperature embodiments of the first or hydrogen PSA unit, the adsorbent in the same or another zone of the adsorbers may include a component catalytically active at the operating temperature of that zone for the steam reforming reaction (e.g. methane fuel or methanol fuel) and/or for the water gas shift reaction. The catalytically active component may be a reduced transition group metal or mixture of metals, or may be a transition group metal dispersed in zeolite cages and reversibly forming a metal carbonyl complex at the operating temperature of the second zone. Because carbon dioxide is preferentially adsorbed relative to steam, while enriched hydrogen is continually removed to the anode channel, the concentrations of carbon dioxide and hydrogen over the catalytically active component are maintained at a reduced level by the PSA process so as to shift the reaction equilibria favorably for the steam reforming and/or water gas shift reactions to proceed within the adsorbers of the first PSA unit. The conversion of carbon monoxide and reformable fuel components is driven toward completion to generate carbon dioxide and additional hydrogen. This is an example of a PSA reactor or "sorption enhanced reactor", enhancing the simple gas separation effect to further generate enriched hydrogen while removing the carbon dioxide and driving the water gas shift reaction substantially to completion while achieving adequate purification of the hydrogen.

Industrial H2 PSA is normally conducted at considerably elevated pressures (>10 bars) to achieve simultaneous high purity and high recovery (~80%–85%). Fuel cell systems operating with pressurized methanol reformers or in integration with gas turbine cycles may operate at relatively high pressures. Molten carbonate fuel cells operate at pressures from atmospheric up to about at most 10 bars, with lower pressures strongly preferred at present as required to achieve extended stack life. Solid oxide fuel cells may be designed to operate at any pressure, with working pressures of about 5–20 bars being preferred in the present invention.

The pressure of the light product gas exiting from the hydrogen PSA and oxygen PSA may vary widely in the disclosed systems and processes. Compressors or other pressure-increasing mechanisms may be employed to boost the light product gas pressure if necessary prior to introduction into the fuel cell. At very low feed pressures (e.g., 2–3 bars), the first PSA may utilize supplemental compression to achieve higher recovery of hydrogen and simultaneously higher concentration of carbon dioxide. Alternative approaches include vacuum pumping to widen the working pressure ratio, or alternatively "heavy reflux" which is recompression and recycle to the PSA feed of a fraction of its exhaust stream at full pressure. Vacuum and heavy reflux options may be combined by using an oversized vacuum pump.

The disclosed systems and processes can improve overall efficiency of fuel cell systems to reduce the proportionate amount of carbon dioxide formed, while enabling delivery as and when desired of that carbon dioxide in highly concentrated form for most convenient sequestration from the atmosphere, e.g. by underground disposal in depleted natural gas reservoirs or for enhanced oil recovery from petroleum reservoirs. In addition, exported power may be delivered only from the fuel cell stack, thus there is no export of power from a thermal bottoming cycle, or generators and associated gear boxes on the thermal bottoming turbines which are thus reduced to simple turbochargers. Instead, according to certain embodiments, the system utilizes high grade waste heat from the fuel cell stack to drive free rotor turbochargers as required for feed air compression, vacuum pumping of exhaust nitrogen-enriched air, and heavy reflux compression of carbon dioxide enriched anode tail gas; with the stack waste heat matched to these auxiliary loads so as to facilitate operation at high current density.

The fuel cell stack can run at relatively high current density (e.g., about 200 to about 400 mA/cm$^2$) to generate the required amount of waste heat for the auxiliary compression loads, since the disclosed PSA systems have dramatically raised open circuit voltages (e.g., about 0.75 to about 0.95 volts). The necessary size of the fuel cell stack size per kW can be reduced greatly at high current density. Equivalently, the same size fuel cell stack can achieve the full power output formerly achieved by the stack plus the thermal bottoming generator, which can be eliminated in certain disclosed embodiments.

The foregoing features and advantages will become more apparent from the following detailed description of several embodiments that proceeds with reference to the accompanying figures.

BRIEF DESCRIPTION OF THE DRAWINGS

Certain embodiments are described below with reference to the following figures:

FIGS. 2 through 5B show transverse sections of the module of FIG. 1.

DETAILED DESCRIPTION OF SEVERAL EMBODIMENTS

FIGS. 1–5

An oxygen-enrichment rotary PSA module is described below in connection with FIGS. 1–5B, but the same or similar rotary PSA module configuration could be used for hydrogen enrichment (i.e., separation) in the disclosed electrical current generating systems. As used herein, a "rotary PSA" includes, but is not limited to, either a PSA wherein an array of adsorbers rotates relative to a fixed valve face or stator or a PSA wherein the valve face or stator rotates relative to an array of adsorbers.

Figure 1:
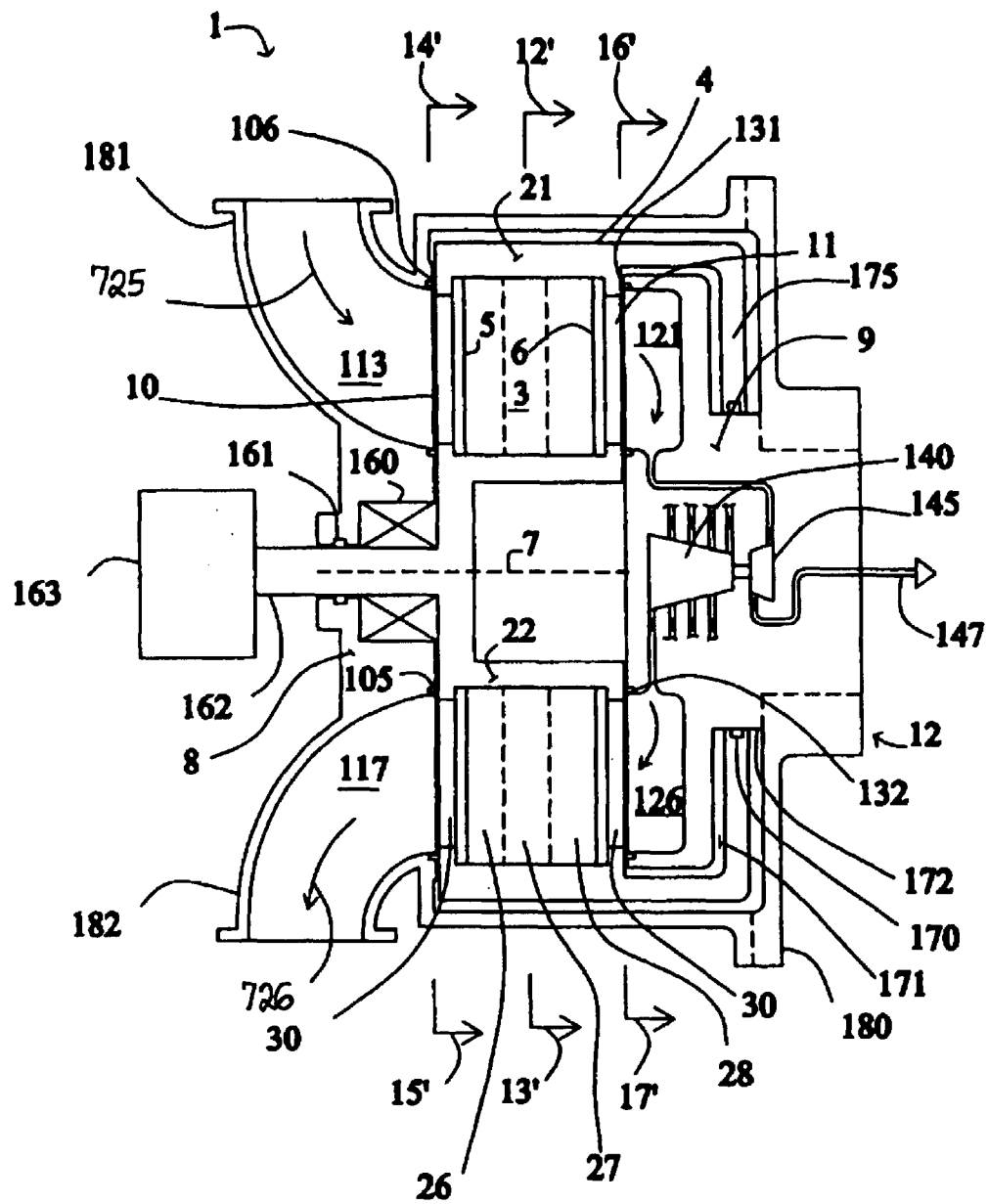
FIG. 1 shows an axial section of a rotary PSA module.

FIG. 1 shows a rotary PSA module 1, which includes a number "N" of adsorbers 3 in adsorber housing body 4. Each adsorber has a first end 5 and a second end 6, with a flow path therebetween contacting a nitrogen-selective adsorbent (for oxygen enrichment). The adsorbers are deployed in an axisymmetric array about axis 7 of the adsorber housing body. The housing body 4 is in relative rotary motion about axis 7 with first and second functional bodies 8 and 9, being engaged across a first valve face 10 with the first functional body 8 to which feed gas mixture is supplied and from which the heavy product is withdrawn, and across a second valve face 11 with the second functional body 9 from which the light product is withdrawn.

In embodiments as particularly depicted in FIGS. 1–5, the adsorber housing 4 rotates and shall henceforth be referred to as the adsorber rotor 4, while the first and second functional bodies are stationary and together constitute a stator assembly 12 of the module. The first functional body shall henceforth be referred to as the first valve stator 8, and the second functional body shall henceforth be referred to as the second valve stator 9. In other embodiments, the adsorber housing 4 may be stationary, while the first and second functional bodies are rotary distributor valve rotors.

In the embodiment shown in FIGS. 1–5, the flow path through the adsorbers is parallel to axis 7, so that the flow direction is axial, while the first and second valve faces are shown as flat annular discs normal to axis 7. However, more generally the flow direction in the adsorbers may be axial or radial, and the first and second valve faces may be any figure of revolution centred on axis 7. The steps of the process and the functional compartments to be defined will be in the same angular relationship regardless of a radial or axial flow direction in the adsorbers.

FIGS. 2–5 are cross-sections of module 1 in the planes defined by arrows 12'–13', 14'–15', and 16'–17'. Arrow 20 in each section shows the direction of rotation of the rotor 4.

Figure 2:
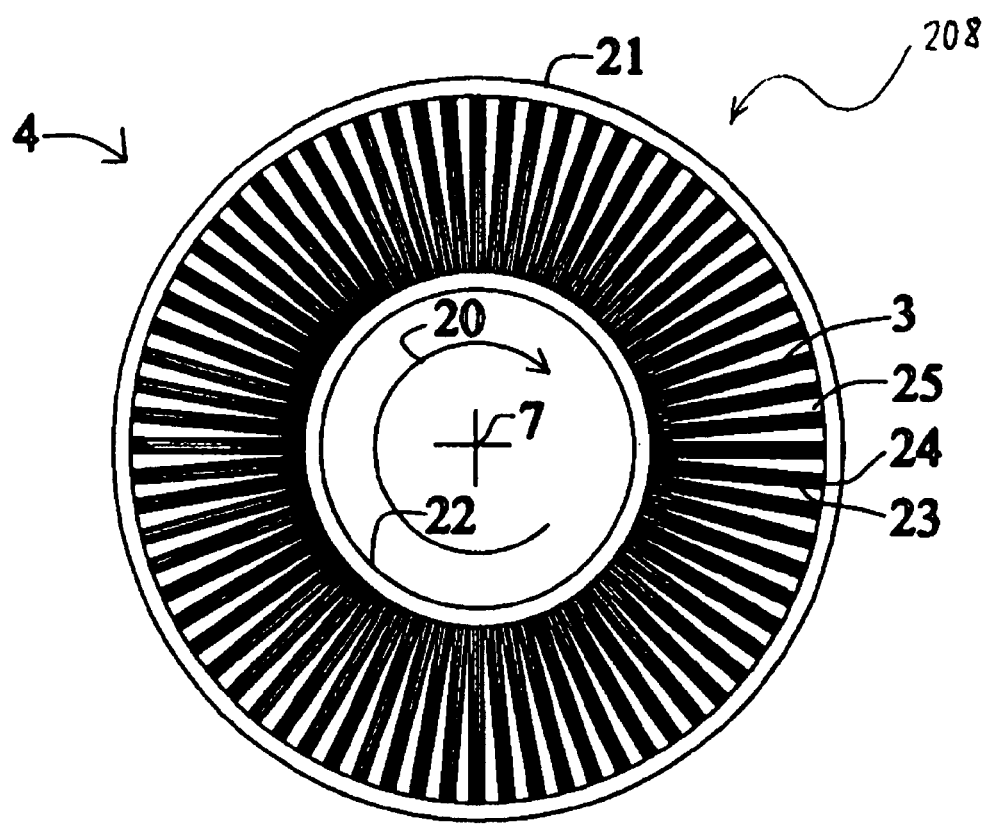

FIG. 2 shows section 12'–13' across FIG. 1, which crosses the adsorber rotor. Here, "N"=72. The adsorbers 3 are mounted between outer wall 21 and inner wall 22 of adsorber wheel 208. Each adsorber comprises a rectangular flat pack 3 of adsorbent sheets 23, with spacers 24 between the sheets to define flow channels here in the axial direction. Separators 25 are provided between the adsorbers to fill void space and prevent leakage between the adsorbers.

As shown in FIG. 1, the adsorbers 3 may include a plurality of distinct zones between the first end 5 and the second end 6 of the flow channels, here shown as three zones respectively a first zone 26 adjacent the first end 5, a second zone 27 in the middle of the adsorbers, and a third zone 28 adjacent the second end 6. As an alternative to distinct zones of adsorbents, the different adsorbents may be provided in layers or mixtures that include varying gradients of adsorbent concentrations along the gas flow path. The transition from one adsorbent to another may also be a blended mixture of the two adsorbents rather than a distinct transition. A further option is to provide a mixture of the different adsorbents that may or may not be homogeneous.

In the case of a $H_2$ PSA operating at ambient temperature up to about 250° C., the first zone may contain an adsorbent or desiccant selected for removing very strongly adsorbed components of the feed gas mixture, such as water or methanol vapor, and some carbon dioxide. The second zone may contain an adsorbent typically selected for bulk separation of impurities at relatively high concentration, and the third zone may contain an adsorbent typically selected for polishing removal of impurities at relatively low concentration.

In the case of a $H_2$ PSA operating at about 250° C. to about 800° C., the first zone may contain an adsorbent that preferentially adsorbs $CO_2$ relative to water vapor as described above. The second zone may contain an adsorbent (e.g., zeolite, Cu(I)-containing material, or Ag(I)-containing material) that preferentially adsorbs CO relative to water vapor. The third zone may contain a desiccant for removing water vapor such as alumina gel. According to one version, the $CO_2$-selective adsorbent and the CO-selective adsorbent may be included or mixed together in a single zone rather than in two distinct zones.

The reforming and/or water gas shift reaction catalyst(s) described above may be included in any part of the adsorber bed, but typically are included in the section prior to removal of the water vapor since water vapor is a reactant for the reforming and water gas shift reactions. In the temperature range of about 600° C. to about 1000° C., nickel supported on alumina is an effective catalyst for steam reforming of methane and the water gas shift reaction. In the temperature range of about 350° C. to about 600° C., iron/chromia catalysts are effective for the water gas shift reaction. In the temperature range of about 200° C. to about 300° C., copper/zinc oxide catalysts are effective for the water gas shift reaction.

In those embodiments in which the $H_2$ PSA is performing the exothermic water gas shift reaction, any excess heat may be removed from the PSA by providing, for example, heat exchange means in a wall of the PSA or in the adsorber beds. In those embodiments in which the $H_2$ PSA is performing the endothermic reforming reaction, any required additional heat may be delivered to the PSA by providing, for example, heat exchange means in a wall of the PSA or in the adsorber beds or by integrating a burner with the PSA.

The adsorbent sheets comprise a reinforcement material (e.g., glass fibre, metal foil or wire mesh) to which the adsorbent material is attached with a suitable binder. For air separation to produce enriched oxygen, alumina gel may be used in the first zone to remove water vapor, while typical nitrogen-effective adsorbents in the second and third zones are X, A or chabazite type zeolites, typically exchanged with lithium, calcium, strontium, magnesium and/or other cations, and with optimized silicon/aluminium ratios as well known in the art. The zeolite crystals are bound with silica, clay and other binders, or self-bound, within the adsorbent sheet matrix. The nitrogen-selective zeolite adsorbents tend to be effective in the temperature range from ambient up to about 100° C.

Satisfactory adsorbent sheets have been made by coating a slurry of zeolite crystals with binder constituents onto the reinforcement material, with successful examples including nonwoven fibreglass scrims, woven metal fabrics, and expanded aluminium foils. Spacers are provided by printing or embossing the adsorbent sheet with a raised pattern, or by placing a fabricated spacer between adjacent pairs of adsorbent sheets. Alternative satisfactory spacers have been provided as woven metal screens, non-woven fibreglass scrims, and metal foils with etched flow channels in a photolithographic pattern. Adsorbers of the layered adsorbent sheet material may be formed by stacking flat or curved sheets; or by forming a spiral roll, with the flow channels between the sheets extending from the first end of the adsorber to the second end thereof; to fill the volume of the adsorber housing of the desired shape. Examples of methods and structures with packed, spirally wound adsorbents are disclosed in commonly-owned, co-pending U.S. Provisional Application No. 60/285,527, filed Apr. 20, 2001, and incorporated herein by reference.

Typical experimental sheet thicknesses have been 150 microns, with spacer heights in the range of 100 to 150 microns, and adsorber flow channel length approximately 20 cm. Using X type zeolites, excellent performance has been achieved in oxygen separation from air at PSA cycle frequencies in the range of 1 to at least 150 cycles per minute, particularly at least 25 cycles per minute.

Figure 3:
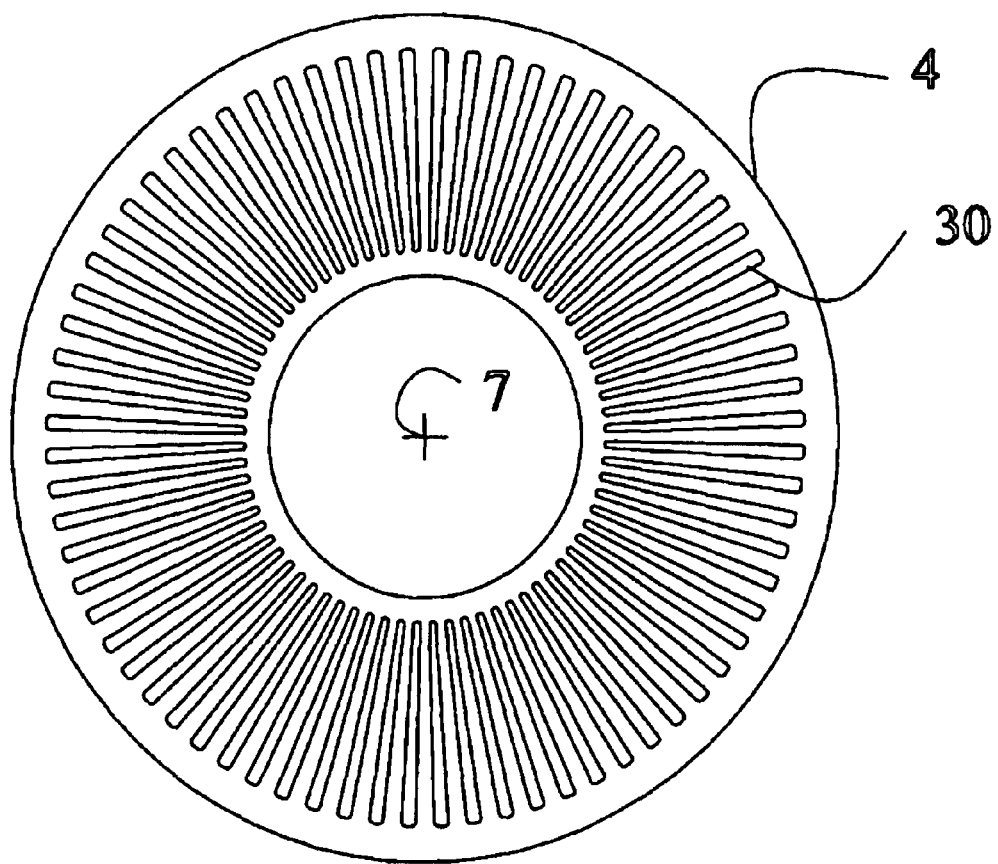

FIG. 3 shows the porting of rotor 4 in the first and second valve faces respectively in the planes defined by arrows 14'–15', and 16'–17'. An adsorber port 30 provides fluid communication directly from the first or second end of each adsorber to respectively the first or second valve face.

Figure 4A:
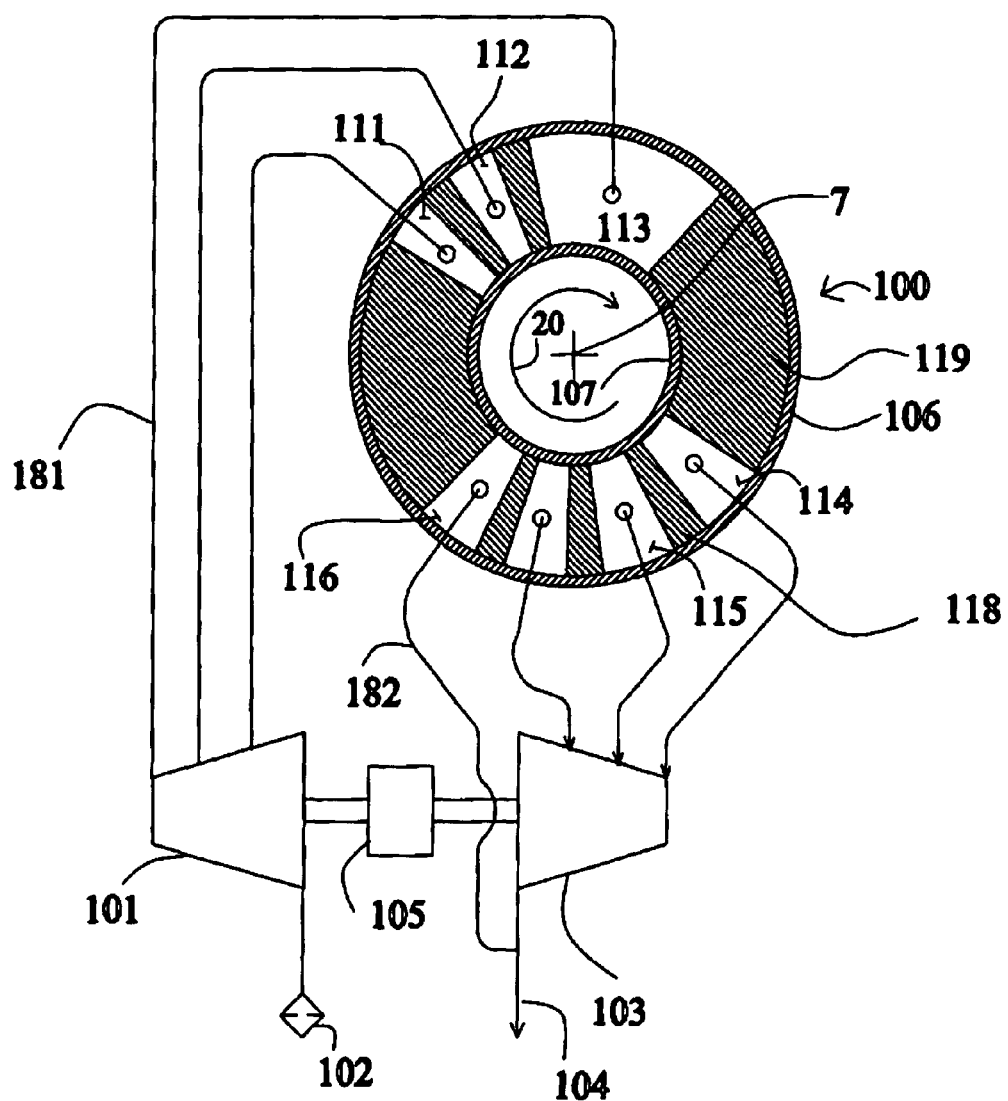
Figure 4B:
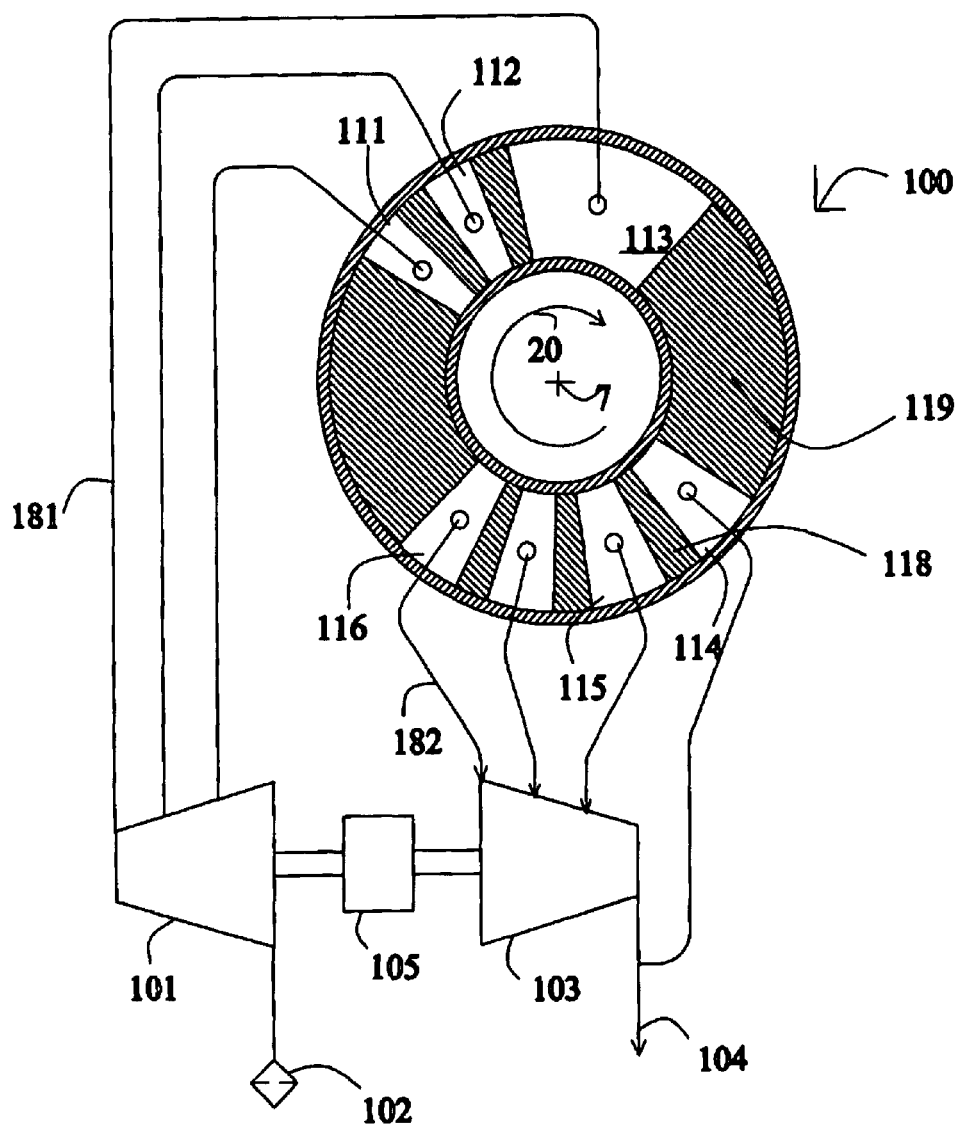

FIGS. 4A and 4B show the first stator valve face 100 of the first stator 8 in the first valve face 10, in the plane defined by arrows 14'–15'. Fluid connections are shown to a feed compressor 101 inducting feed air from inlet filter 102, and to an exhauster 103 delivering nitrogen-enriched second product to a second product delivery conduit 104. Compressor 101 and exhauster 103 are shown coupled to a drive motor 105.

Arrow 20 indicates the direction of rotation by the adsorber rotor. In the annular valve face between circumferential seals 106 and 107, the open area of first stator valve face 100 ported to the feed and exhaust compartments is indicated by clear angular segments 111–116 corresponding to the first functional ports communicating directly to functional compartments identified by the same reference numerals 111–116. The substantially closed area of valve face 100 between functional compartments is indicated by hatched sectors 118 and 119, which are slippers with, zero clearance, or preferably a narrow clearance to reduce friction and wear without excessive leakage. Typical closed sector 118 provides a transition for an adsorber, between being open to compartment 114 and open to compartment 115. A gradual opening is provided by a tapering clearance channel between the slipper and the sealing face, so as to achieve gentle pressure equalization of an adsorber being opened to a new compartment. Much wider closed sectors (e.g. 119) are provided to substantially close flow to or from one end of the adsorbers when pressurization or blowdown is being performed from the other end.

The feed compressor provides feed gas to feed pressurization compartments 111 and 112, and to feed production compartment 113. Compartments 111 and 112 have successively increasing working pressures, while compartment 113 is at the higher working pressure of the PSA cycle. Compressor 101 may thus be a multistage or split stream compressor system delivering the appropriate volume of feed flow to each compartment so as to achieve the pressurization of adsorbers through the intermediate pressure levels of compartments 111 and 112, and then the final pressurization and production through compartment 113. A split stream compressor system may be provided in series as a multistage compressor with interstage delivery ports; or as a plurality of compressors in parallel, each delivering feed gas to the working pressure of a compartment 111 to 113. Alternatively, compressor 101 may deliver all the feed gas to the higher pressure, with throttling of some of that gas to supply feed pressurization compartments 111 and 112 at their respective intermediate pressures.

Similar, exhauster 103 exhausts heavy product gas from countercurrent blowdown compartments 114 and 115 at the successively decreasing working pressures of those compartments, and finally from exhaust compartment 116 which is at the lower pressure of the cycle. Similarly to compressor 101, exhauster 103 may be provided as a multistage or split stream machine, with stages in series or in parallel to accept each flow at the appropriate intermediate pressure descending to the lower pressure.

In the example embodiment of FIG. 4A, the lower pressure is ambient pressure, so exhaust compartment 116 exhaust directly to heavy product delivery conduit 104. Exhauster 103 thus provides pressure letdown with energy recovery to assist motor 105 from the countercurrent blowdown compartments 114 and 115. For simplicity, exhauster 103 may be replaced by throttling orifices as countercurrent blowdown pressure letdown means from compartments 114 and 115.

In some embodiments, the lower pressure of the PSA cycle is subatmospheric.

Exhauster 103 is then provided as a vacuum pump, as shown in FIG. 4B. Again, the vacuum pump may be multistage or split stream, with separate stages in series or in parallel, to accept countercurrent blowdown streams exiting their compartments at working pressures greater than the lower pressure which is the deepest vacuum pressure. In FIG. 4B, the early countercurrent blowdown stream from compartment 114 is released at ambient pressure directly to heavy product delivery conduit 104. If for simplicity a single stage vacuum pump were used, the countercurrent blowdown stream from compartment 115 would be throttled down to the lower pressure over an orifice to join the stream from compartment 116 at the inlet of the vacuum pump. A vacuum pump can allow the PSA to operate at lower pressures that may be advantageous when the PSA is coupled to a fuel cell operating at lower pressures such as a MCFC operating at ambient pressure. Vacuum PSA operation favors high oxygen yield or fractional recovery, and hence high-energy efficiency, in air separation.

Figure 5B:
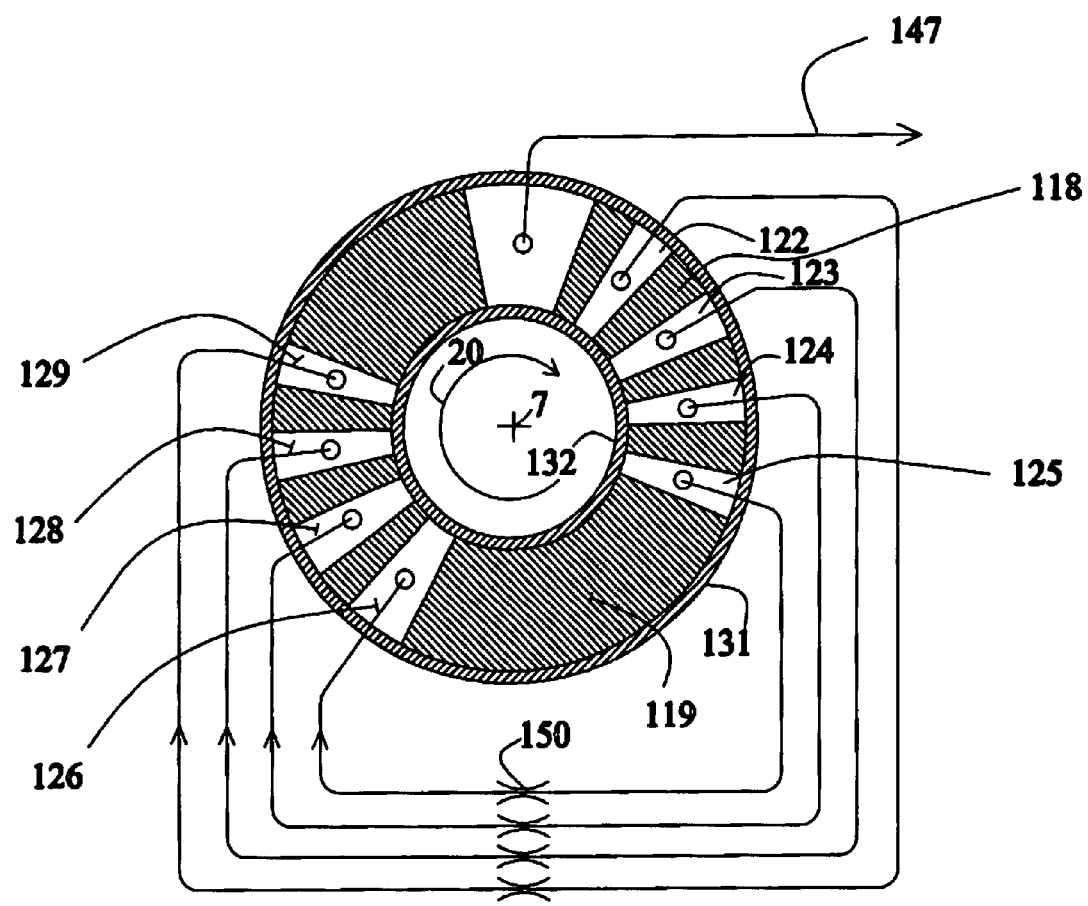

FIGS. 5A and 5B shows the second stator valve face, at section 16'–17' of FIG. 1. Open ports of the valve face are second valve function ports communicating directly to a light product delivery compartment 121; a number of light reflux exit compartments 122, 123, 124 and 125; and the same number of light reflux return compartments 126, 127, 128 and 129 within the second stator. The second valve function ports are in the annular ring defined by circumferential seals 131 and 132. Each pair of light reflux exit and return compartments provides a stage of light reflux pressure letdown, respectively for the PSA process functions of supply to backfill, full or partial pressure equalization, and cocurrent blowdown to purge.

Illustrating the option of light reflux pressure letdown with energy recovery, a split stream light reflux expander 140 is shown in FIGS. 1 and 5A to provide pressure let-down of four light reflux stages with energy recovery. The light reflux expander provides pressure let-down for each of four light reflux stages, respectively between light reflux exit and return compartments 122 and 129, 123 and 128, 124 and 127, and 125 and 126 as illustrated. The light reflux expander 140 may power a light product booster compressor 145 by drive shaft 146, which delivers the oxygen enriched light product to oxygen delivery conduit 147 and compressed to a delivery pressure above the higher pressure of the PSA cycle. Illustrating the option of light reflux pressure letdown with energy recovery, a split stream light reflux expander 140 is provided to provide pressure letdown of four light reflux stages with energy recovery. The light reflux expander serves as pressure let-down means for each of four light reflux stages, respectively between light reflux exit and return compartments 122 and 129, 123 and 128, 124 and 127, and 125 and 126 as illustrated.

Since the light reflux and light product have approximately the same purity, expander 140 and light product compressor 145 may be hermetically enclosed in a single housing which may conveniently be integrated with the second stator as shown in FIG. 1. This configuration of a "turbocompressor" booster without a separate drive motor is advantageous, as a useful pressure boost can be achieved without an external motor and corresponding shaft seals, and can also be very compact when designed to operate at high shaft speeds.

FIG. 5B shows the simpler alternative of using a throttle orifice 150 as the pressure letdown means for each of the light reflux stages.

Turning back to FIG. 1, compressed feed gas is supplied to compartment 113 as indicated by arrow 725, while heavy product is exhausted from compartment 117 as indicated by arrow 726. The rotor is supported by bearing 160 with shaft seal 161 on rotor drive shaft 162 in the first stator 8, which is integrally assembled with the first and second valve stators. The adsorber rotor is driven by motor 163 as rotor drive means.

A buffer seal 170 is provided to provide more positive sealing of a buffer chamber 171 between seals 131 and 171. In order to further minimize leakage and to reduce seal frictional torque, buffer seal 171 seals on a sealing face 172 at a much smaller diameter than the diameter of circumferential seal 131. Buffer seal 170 seals between a rotor extension 175 of adsorber rotor 4 and the sealing face 172 on the second valve stator 9, with rotor extension 175 enveloping the rear portion of second valve stator 9 to form buffer chamber 171. A stator-housing member 180 is provided as structural connection between first valve stator 8 and second valve stator 9. Direct porting of adsorbers to the stator face is an alternative to providing such seals and is described in commonly-owned, co-pending U.S. Provisional Application No. 60/301,723, filed Jun. 28, 2001, and incorporated herein by reference.

In the following system figures of this disclosure, simplified diagrams will represent a PSA apparatus or module. These highly simplified diagrams will indicate just a single feed conduit 181 to, and a single heavy product conduit 182 from, the first valve face 10; and the light product delivery conduit 147 and a single representative light reflux stage 184 with pressure let-down means communicating to the second valve face 11.

FIGS. 6–14 disclose various energy recovery systems using different heat recovery working fluids. In one variant, the oxygen PSA compressor is integrated with an indirectly-heated gas turbine bottoming cycle using air as the working fluid. At least a portion of the air is provided to an oxygen enrichment PSA at suitable feed pressures for the PSA process; and the remainder of the air is compressed to a higher pressure as a gas turbine cycle working fluid indirectly heated by the fuel cell stack through heat exchangers coupled to the cathode and/or anode flow loops.

In other embodiments, the thermal bottoming working fluid is an anode loop gas in a gas turbine or Brayton cycle. If the hydrogen enrichment PSA is operated near ambient temperature, a recuperative heat exchanger is used to achieve high thermodynamic efficiency of the thermal bottoming cycle. Alternatively, if the hydrogen enrichment PSA is operated with its second end at an elevated temperature approaching that of the fuel cell stack while its first end is maintained at a heat rejection temperature near ambient, it may be used as a thermal rotary regenerator for the gas turbine cycle using anode gas as working fluid.

Hydrogen may be used as the fuel for SOFC power plants. With the anode gas as a thermal bottoming cycle working fluid, hydrogen containing a substantial fraction of steam (e.g. about 25% to about 50% steam in hydrogen) may be the working fluid for expansion, while the working fluid for compression is hydrogen from which fuel cell product water has been substantially removed by condensation. A radial flow expander may be used for the hydrogen/steam mixture exiting the fuel cell anode. Because of the low molecular weight of relatively dry hydrogen being compressed after condensation, alternative suitable compressors include high-speed centrifugal, multistage centrifugal, and positive displacement (e.g. twin screw) compressors.

For small power plants, the thermal bottoming cycle may use a separate working fluid from the cathode or anode gases, such as steam in a Rankine cycle or hydrogen in a Stirling cycle. For small SOFC fuel cells powered by hydrogen, the use of a Stirling engine for thermal bottoming is particularly attractive because the engine working fluid may be replenished from the hydrogen fuel supply. The need for completely leak-tight Stirling engine seals for working fluid containment is thus relaxed in the present application.

Because the present disclosed systems and processes use oxygen enrichment and hydrogen enrichment by PSA to elevate the voltage and/or current density delivered by the fuel cell stack, the fractional amount of fuel heating value delivered as high grade waste heat to a thermal bottoming cycle is greatly reduced over the prior art. Accordingly, the thermal bottoming working fluid flow rates and heat exchange duties are correspondingly reduced. The power rating of the thermal bottoming cycle is reduced in proportion to increased power delivered directly by the fuel cell stack. The net mechanical power delivered by the thermal bottoming cycle is applied predominantly or exclusively to the compression loads associated with the PSA auxiliaries.

FIGS. 6–9

Each of FIGS. 6–9 is a simplified schematic of an example of a molten carbonate fuel cell power plant 200, including the fuel cell 202, a high temperature PSA unit 204 co-operating with a combustor 206 to transfer carbon dioxide from the anode side to the cathode side of the fuel cell, and an integrated gas turbine unit 208 for gas compression and expansion. The PSA unit 204 increases hydrogen concentration and reduces carbon dioxide concentration over the cathode, thus increasing cell voltage. This directly increases fuel cell stack efficiency and electrical output, while also reducing the heat generated by the fuel cell so that the fraction of plant power output to be recovered less efficiently by a thermal bottoming cycle is reduced. The systems shown in FIGS. 6–9 are only examples and other systems with different arrangements of devices and conduits, or with additional or fewer devices and conduits could also be used.

Molten carbonate fuel cell stack 202 includes the molten carbonate electrolyte 210 supported on a porous ceramic matrix, interposed between anode channel 212 and cathode channel 214. The anode channel has an inlet 216 and an outlet 218, while the cathode channel 214 has an inlet 220 and an outlet 222.

Figure 6:
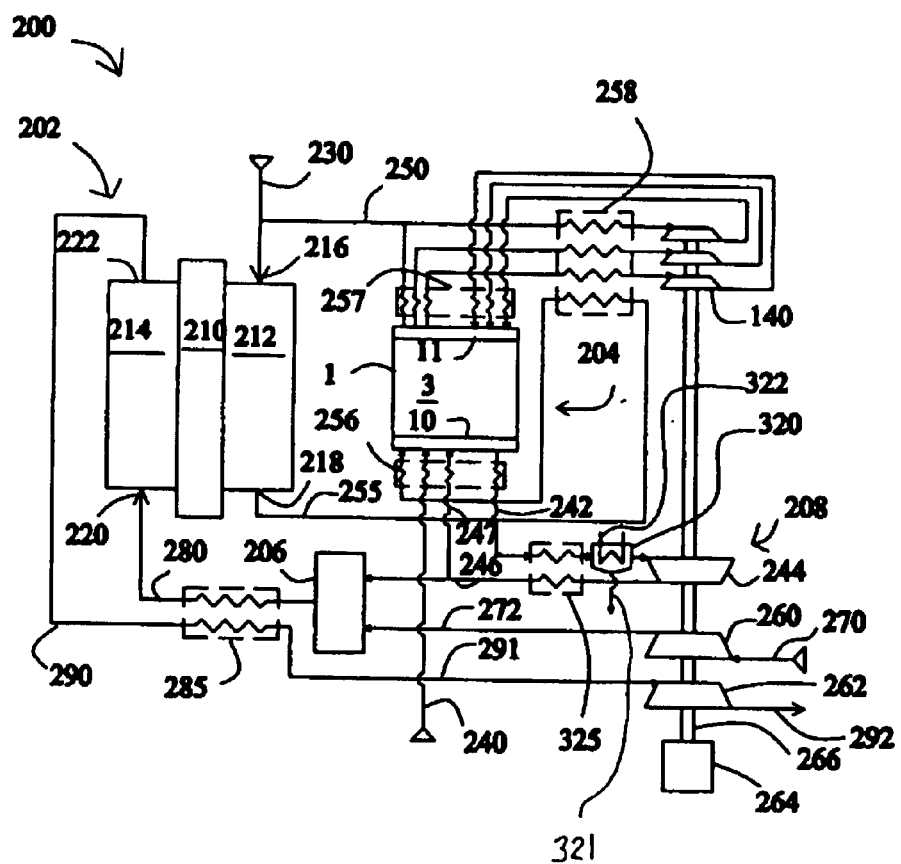
FIGS. 6 through 9 show simplified schematics of alternative MCFC cell plants embodiments.

The embodiment of FIG. 6 illustrates two alternatives for feed gas supply in combination. More typically, either of these feed gas supply alternatives might be used separately in any given MCFC installation. These alternatives correspond to the suitability of the feed gas for direct admission to the fuel cell anode, or for admission only after treatment by the first PSA unit. For the case of natural gas being the fuel, these alternatives also correspond to the fuel processing options or combinations of (1) "internal reforming" within the fuel cell stack, (2) "sorption enhanced reforming" within the first PSA unit, or (3) "external reforming" outside the immediate MCFC system as here described.

Endothermic reforming reactions are

$$CH_4 + H_2O \rightarrow CO + 3H_2$$

and

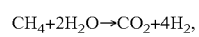
$$CH_4 + 2H_2O \rightarrow CO_2 + 4H_2,$$

with exothermic water gas shift

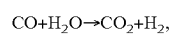
$$CO + H_2O \rightarrow CO_2 + H_2,$$

supplemented by partial combustion in the case of autothermal reforming

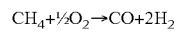
$$CH_4 + \tfrac{1}{2}O_2 \rightarrow CO + 2H_2$$

A first feed gas supply inlet 230 communicates to anode inlet 216, introducing a first feed gas already compressed and preheated to the MCFC working conditions. The first feed gas might be hydrogen, syngas generated by an external fuel processor (e.g. coal gasifier or steam methane reformer), or natural gas for internal reforming within the anode channel 212 which would then be modified as known in the art to contain a suitable steam reforming catalysts such as nickel supported on alumina.

A second feed gas supply inlet 240 communicates to a feed production compartment in first rotary valve face 10 of the first PSA unit 204, again introducing feed gas already compressed and preheated to the first PSA unit higher pressure and working temperature. The carbon dioxide and steam enriched heavy product stream is released from the blowdown and exhaust compartments in first rotary valve face 10 into conduit 242 at the lower pressure of the first unit PSA cycle. The higher pressure of the first PSA is slightly above the working pressure of the MCFC, while the lower pressure may be atmospheric or subatmospheric. If the MCFC working pressure is selected to be near atmospheric, the first PSA would be a vacuum PSA with the lower cycle pressure in the range of about 0.1 to 0.5 bars absolute.

The heavy product stream from conduit 242 is compressed back up to the higher pressure of first PSA by carbon dioxide compressor 244, which delivers the compressed heavy product stream to conduit 246 which branches to heavy reflux conduit 247 communicating to a feed production compartment in first rotary valve face 10 of the first PSA unit 204, and to gas turbine combustor 206. Alternatively, if the heavy product stream in conduit 242 is at subatmospheric pressure, then device 244 could be a vacuum pump for extracting the heavy product stream.

Enriched hydrogen light product gas from first PSA 204 is delivered by conduit 250 from the second rotary valve face 11 of the first PSA unit to anode inlet 216. Three stages of light reflux are shown, in which separate streams of light product gas at successively declining pressures are withdrawn from the second rotary valve face 11 for pressure letdown in respective stages of light reflux expander 140, and then returned to the second rotary valve face for purging and repressurization of the adsorbers. After passing through the anode channel 212, anode gas depleted in hydrogen and enriched in carbon dioxide and steam is withdrawn from anode exit 218 through conduit 255 for treatment by first PSA unit 204 to recover hydrogen, carbon dioxide, and methane fuel components, while removing carbon dioxide and at least a portion of the steam.

Anode channel 212, conduit 255, the PSA unit 204, and conduit 250 comprise an anode loop in which hydrogen is recirculated and replenished for substantially complete utilization of the hydrogen and other fuel components, while carbon dioxide is continually removed by PSA 204. A pressure booster means may be useful to overcome flow pressure drop around the anode loop. In FIG. 6, the pressure booster means is the PSA unit 204, with no mechanical pressure booster being required. The anode exit gas in conduit 255 is at a moderately lower pressure than the feed gas in feed conduit 240 and the heavy reflux gas in conduit 247. Hence the anode exhaust gas is introduced to a feed repressurization compartment in first rotary valve face 10. After the anode exhaust gas has entered the adsorbers 3, it is there compressed back up to the higher pressure by feed gas and heavy reflux gas entering the adsorbers from conduits 240 and 247.

Optionally, the heavy reflux step and conduit 247 may be eliminated, which will increase the fraction of fuel gas components (hydrogen, carbon monoxide and methane) delivered to combustor 206. With a relatively high-pressure ratio between the higher and lower pressures in the first PSA, relatively high recovery of the fuel gas components in the light product gas (for recycle to the fuel cell anode) will be achieved. With a sufficiently large heavy reflux stream, and corresponding power consumption in heavy reflux compression, fuel gas components may be substantially removed from the heavy product of carbon dioxide and/or water vapour so that combustor 206 might be eliminated or replaced with a small catalytic combustor.

A first heat exchanger 256 may be provided for the feed, heavy reflux and exhaust conduits communicating to the first valve face 10, so as to establish a first temperature at the first end of the adsorbers. A second heat exchanger 257 may be provided for the light product, light reflux exit and light reflux return conduits communicating to the second valve face 11, so as to establish a second temperature at the second end of the adsorbers. A third heat exchanger 258 may be provided to transfer heat from the anode exit conduit 255 to the light reflux exit conduits communicating to the inlets of the light reflux expander stages 140, so that high grade heat from the fuel cell stack is recovered at least in part in the expander 140.

Gas turbine assembly 208 includes compressor 260 and turbine 262, coupled to a motor/generator 264 by shaft 266 and to heavy product compressor 244 and light reflux expander 140 by shaft 267. Ambient air is introduced to compressor 260 by infeed conduit 270, and is there compressed to working pressure for delivery by conduit 272 to combustor 206. Combustor 206 burns residual fuel values (including some hydrogen and unconverted carbon monoxide and fuel) in the carbon dioxide rich heavy product stream. A catalyst may be provided in combustor 206 to ensure stable combustion with high inert concentrations, or supplemental fuel may be added thereto. According to the embodiment shown in FIG. 6, the hot gas (i.e., the combustion product) exiting combustor 206 by conduit 280 is cooled in recuperative heat exchanger 285 to approximately the MCFC operating temperature for admission as cathode gas to cathode inlet 220. The cathode gas contains carbon dioxide and residual oxygen, diluted by steam and nitrogen. After circulation through cathode channel 214 in which some oxygen and carbon dioxide are consumed, the depleted cathode gas is conveyed from cathode exit 222 by conduit 290 back to recuperator 285 for reheat to an elevated turbine entry temperature for admission by conduit 291 to turbine 262. After expansion through turbine 262, the exhaust cathode gas is discharged through conduit 292 where further heat exchange would preferably take place to obtain most efficient heat recovery, e.g. for preheating the feed gas to inlets 230 and 240. Thus, turbine 262 drives turbine assembly 208.

According to another embodiment (not shown), a portion of the hot gas (i.e., the combustion product) exiting combustor 206 may be diverted directly to turbine 262 rather than passing through the cathode channel 214. A further variant would involve providing a second heavy product gas stream from PSA 204 into a second combustor and then introducing the hot combustion product directly into turbine 262.

Figure 7:
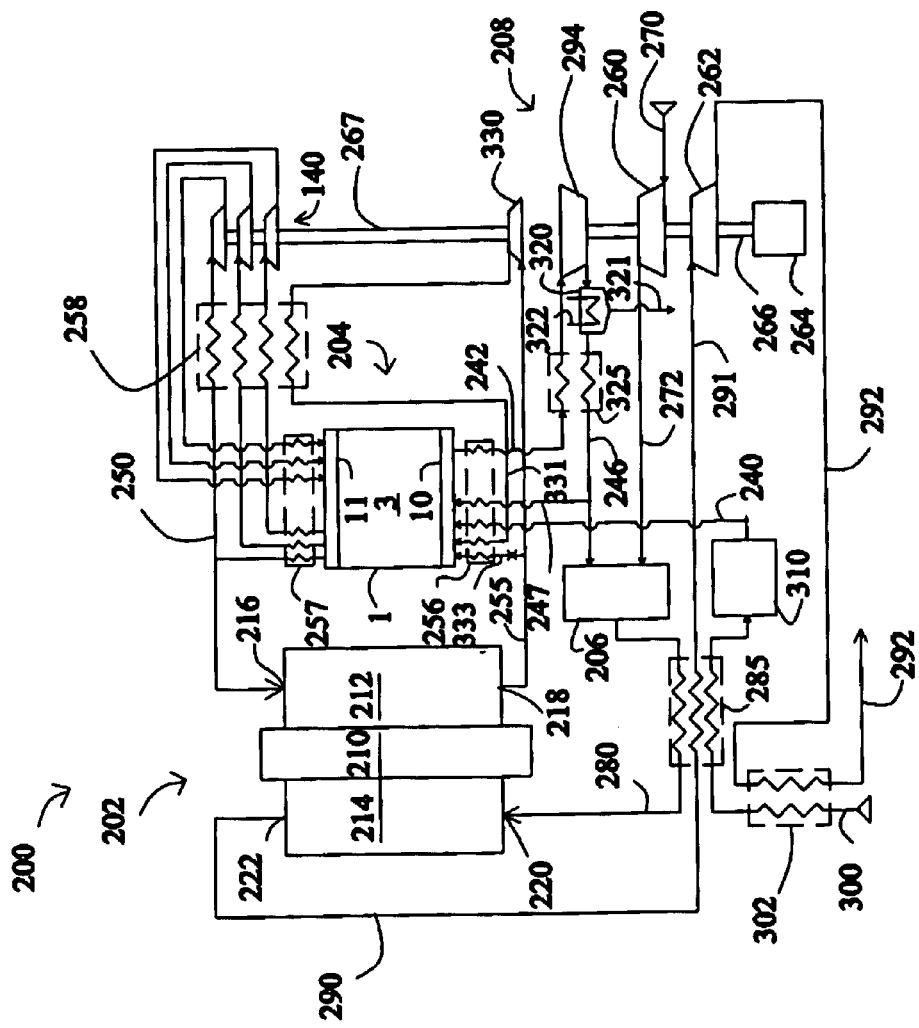

Also shown in FIG. 6 is the removal of water from the heavy product in conduit 242, either prior to compression by carbon dioxide compressor 244 as shown in FIG. 6, or after compression if a vacuum pump is used as compressor 244 as shown in FIG. 7. A condenser 320 may be provided in conduit 242 for water removal and for cooling the heavy product gas so as to reduce the compression power required by compressor 244. Liquid water is removed by drain 321. The condensation temperature may be established by cooler 322. A fourth heat exchanger 325 may be provided for recuperative heat exchange between conduits 242 and 246.

Several alternative features and improvements are shown in FIG. 7. In this figure, a thermally integrated reformer is shown. Already compressed fuel and water (or steam) are admitted from infeed conduit 300, passing through an exhaust recuperator 302 for recovering heat from expanded cathode exhaust in conduit 292, and then passing through recuperator 285 to reach an elevated reforming temperature (e.g. 800° to 1200° C.) for admission to catalytic reforming reactor 310. The endothermic reforming reaction reduces the temperature of the delivered syngas to about the MCFC temperature, and this syngas is delivered by conduit 240 to a feed production compartment in the first rotary valve face 10 of PSA unit 204.

A further feature in FIG. 7 is the provision of a mechanical pressure booster for the anode loop, as booster compressor 330 which is powered directly by light reflux expander 140 through shaft 267. Recompressed anode gas from conduit 255 is boosted back to the higher pressure by booster 330, and is delivered by conduit 331 to a production feed compartment in the first rotary valve face 10. A portion of the anode exhaust gas in conduit 255 may still be delivered directly to a feed pressurization compartment by conduit 333. In this example, the sole power source for booster 330 is expander 140, which is now separated from gas turbine assembly 208.

Figure 8:
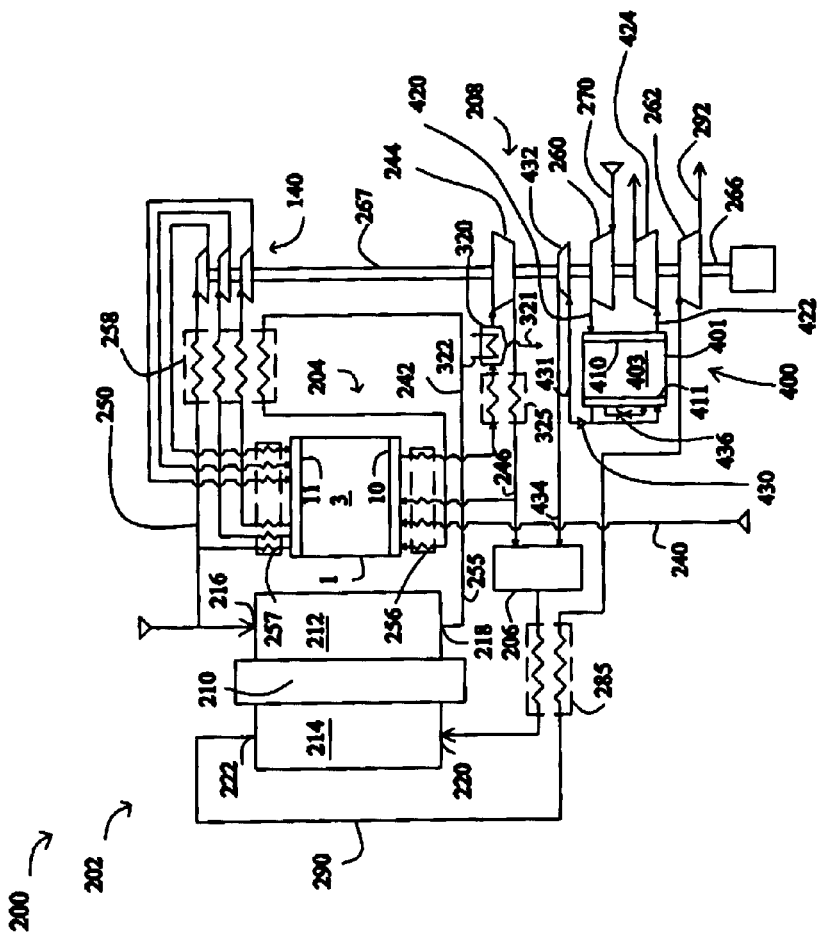
Figure 9:
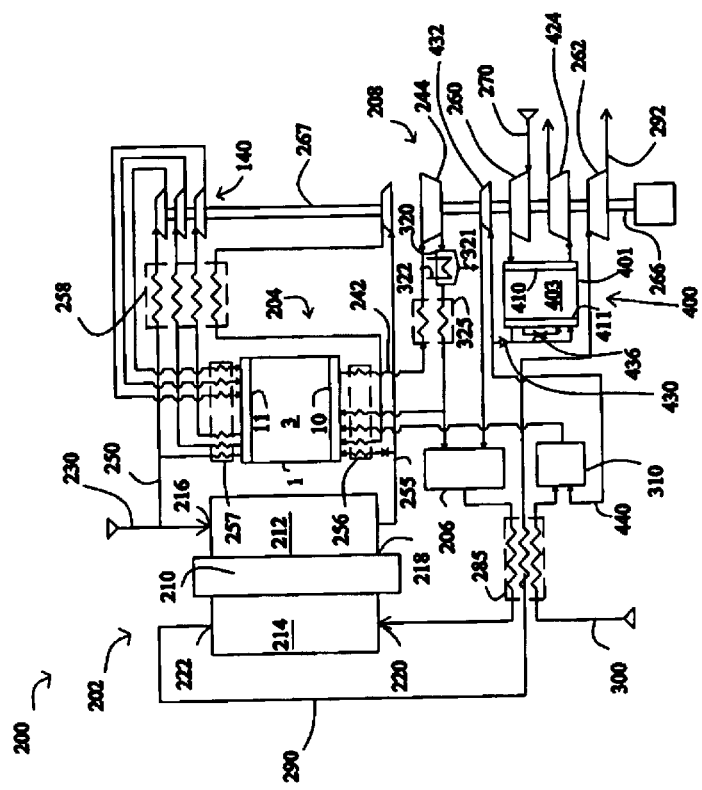

In FIGS. 8 and 9, further embodiments are shown incorporating an oxygen VPSA in order to boost the oxygen and carbon dioxide partial pressures in the cathode channel, so as to increase the cell electromotive force and thus reduce the thermal bottoming load while enhancing overall plant efficiency. In FIGS. 8 and 9 as in FIGS. 6 and 7, various details of recuperative heat recovery and water condensation from the heavy product are shown in simplified schematic form.

The oxygen PSA or VPSA unit 400 includes a rotary module 401 with nitrogen-selective adsorbent in adsorbers 403, a first rotary valve face 410 and a second rotary valve face 411. The first rotary valve face 410 receives compressed feed air at a feed production compartment from feed air compressor 260 via conduit 420, and discharges exhaust nitrogen enriched air from an exhaust compartment via conduit 422 to an optional vacuum pump 424 (to be included for VPSA or excluded for simple PSA) for discharge to atmosphere or any other use for moderately enriched nitrogen. The second rotary valve face 411 delivers enriched light product oxygen at e.g. 90% purity by non-return valve 430 in conduit 431 to oxygen compressor 432 which delivers the oxygen at a pressure of at least the MCFC working pressure to conduit 434 and thence combustor 206. Light reflux pressure letdown throttles 436 are also provided for light reflux stages in the second rotary valve face 411.

According to a variation of the embodiments shown in FIGS. 8 and 9, the anode exhaust gas exiting anode outlet 218 could be introduced directly into a combustor 206 without first passing through a hydrogen PSA unit. The anode exhaust gas then could be burned with the enriched oxygen stream produced by the oxygen PSA unit 400.

Oxygen enrichment of the air provided to combustor 206 may substantially reduce the inert load of nitrogen and argon in the cathode channel, thus enhancing electrochemical energy conversion performance as discussed above. The working fluid for the gas turbine expander 262 is thus largely concentrated carbon dioxide with only small amounts of atmospheric gases. Moreover, oxygen enrichment may provide more complete combustion without a catalyst or with a smaller amount of catalyst and it may substantially eliminate the production of NOX emissions.

FIG. 9 shows the additional feature that a portion of the enriched oxygen from PSA 400 is used for fuel processing, either within the plant as here shown, or externally as in the example that coal gasification is used to generate syngas feed. Here, a portion of the compressed oxygen in conduit 434 is conveyed by conduit 440 to reformer 310, which here is an autothermal reformer for e.g., steam reforming natural gas.

FIGS. 10–14

Figure 10:
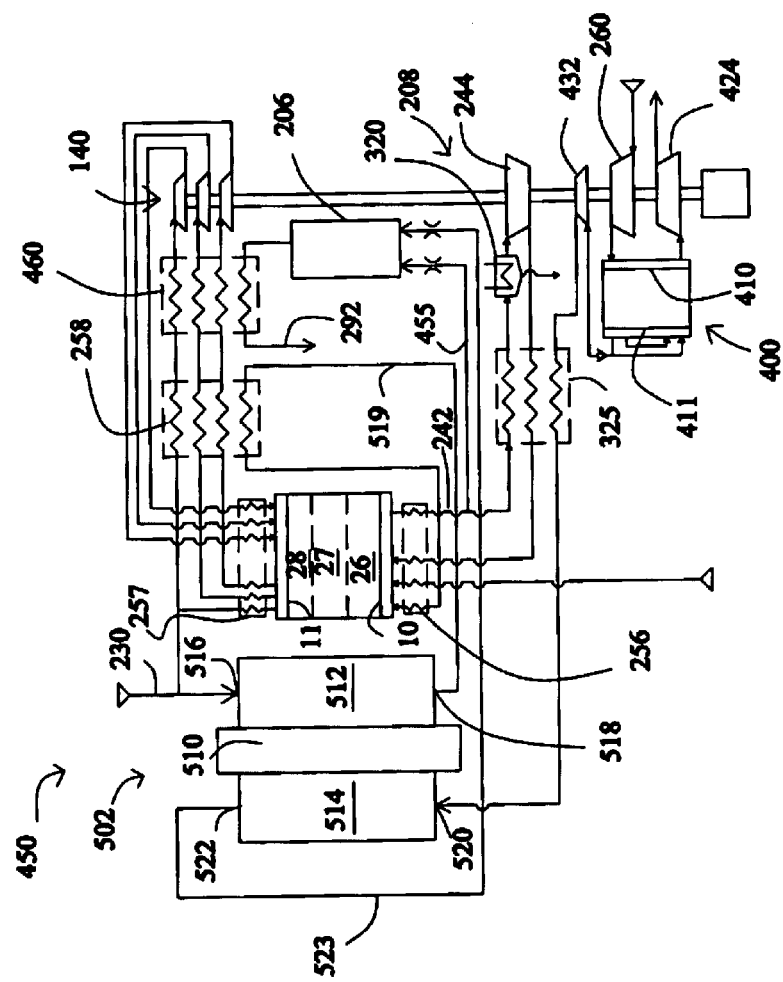
FIGS. 10 through 14 show simplified schematics of alternative SOFC cell plants embodiments.

FIG. 10 shows a simplified schematic of an example of an SOFC system embodiment 450 to which fuel gas (which may be natural gas, syngas or hydrogen) is provided by fuel inlet 230. Embodiment 450 includes an oxygen VPSA whose compression machinery is primarily powered by a regenerative gas turbine cycle using the anode gas as working fluid to recover cell stack waste heat as a thermal bottoming cycle to power system auxiliary compression loads. Alternatively, enriched oxygen may be delivered by a positive pressure PSA process as illustrated in FIG. 4A. Components and reference numerals generally follow the description as given above for FIGS. 8 and 9. The systems shown in FIGS. 10–14 are only examples and other systems with different arrangements of devices and conduits, or with additional or less devices and conduits could also be used.

Solid oxide fuel cell stack 502 includes a solid oxide electrolyte membrane 510 interposed between anode channel 512 and cathode channel 514. The anode channel has an inlet 516 and an outlet 518 connected by anode loop 519, while the cathode channel 514 has an inlet 520 and an outlet 522. If the fuel is natural gas, it is internally reformed within the anode channel 512, while a suitable steam concentration is maintained in anode loop 519 so as to prevent carbon deposition.

The heavy product gas from the first PSA is in part exhausted by conduit 455 branching from conduit 242 and conveying the anode loop exhaust to combustor 206. Cathode tail gas may be used as oxidant in combustor 206, and is conveyed from cathode outlet 522 by conduit 457 to the combustor. Flue gas from combustor 206 is discharged by exhaust conduit 459 after heat recovery in heat exchanger 460, superheating the light reflux gas before entry to the stages of light reflux expander 140. The working fluid in expander 140 is a mixture of steam and hydrogen if hydrogen is the fuel, also including carbon dioxide if methane or syngas is the fuel, introduced by fuel feed inlet 230.

The adsorber working temperature of the first PSA may be close to ambient temperature, in which case heat exchangers 256 and 257 will be heavily loaded recuperators. Alternatively, the first PSA may operate at elevated temperature, in which case the second temperature adjacent the second valve face is preferably elevated relative to the first temperature adjacent the first valve face, so that the adsorber rotor functions as a thermal rotary regenerator.

In one embodiment, the first zone 26 of the adsorbers operates in the temperature range from substantially ambient to about 300° C. using, for example, alumina, zeolite 13X, or an at least moderately hydrophobic zeolite such as zeolite Y as the adsorbent. The second zone 27 of the adsorbers may operate in the temperature range from about 300° C. to about 500° C. using, for example, alumina or a promoted hydrotalcite adsorbent. The third zone 28 of the adsorbers may operate in the temperature range from about 5300° C. to about 800° C. using, for example, alumina or ultrastable Y zeolite hydrotalcite adsorbent. Alternatively, the third zone 28 may contain (instead of adsorbent) a substantially nonadsorptive ceramic or metal material selected for utility in the high temperature zone of a rotary regenerator.

Figure 11:
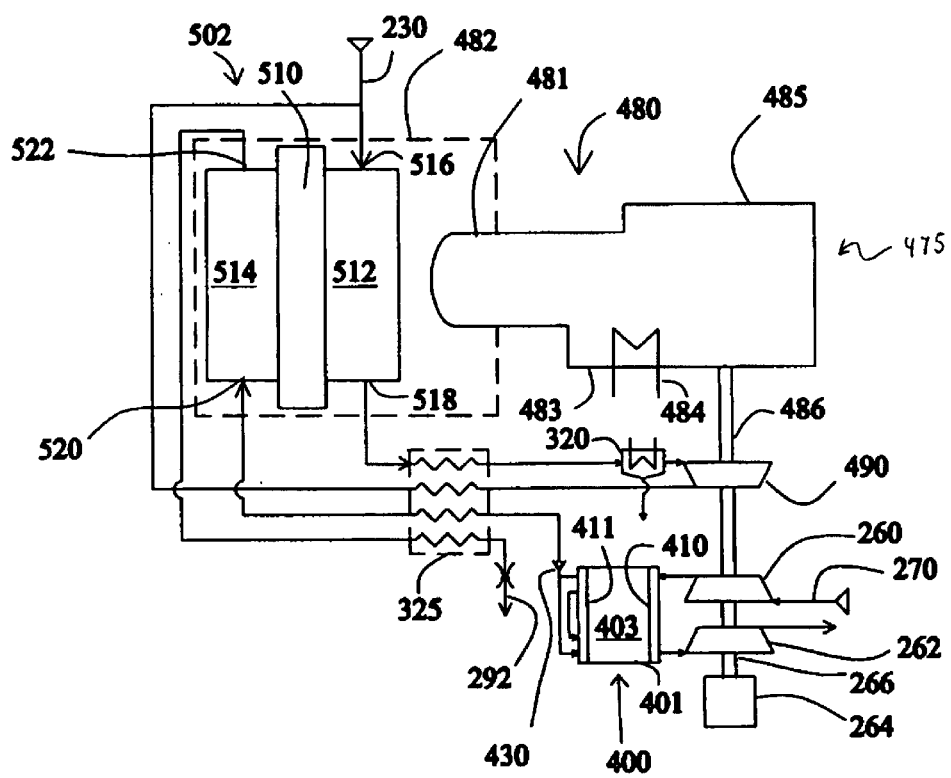

FIG. 11 shows a simplified schematic of another embodiment 475 of a SOFC fuel cell system, for which the fuel is hydrogen. This embodiment is particularly useful for smaller scale installations for which high efficiency is required. In embodiment 475, a Stirling engine 480 is used as the thermal bottoming system to recover waste heat. Engine 480 has a hot end 481 in which expansion of a Stirling cycle working fluid is performed to take up heat from a thermally insulated jacket 482 enclosing the fuel cell stack. Engine 480 has a cool end 483 in which a compression of the Stirling cycle working fluid is performed to reject heat at substantially ambient temperature from cooler 484. Compressed hydrogen may be used as the Stirling cycle working fluid.

The Stirling engine may have a crank mechanism 485 to drive shaft 486 coupled to anode gas recirculation blower 490, the oxygen PSA feed blower 260, an optional PSA vacuum pump 424, and an optional generator 264. Alternatively, a free piston Stirling engine mechanism may be used to drive all or some of the above compression loads directly without a shaft coupling.

Figure 12:
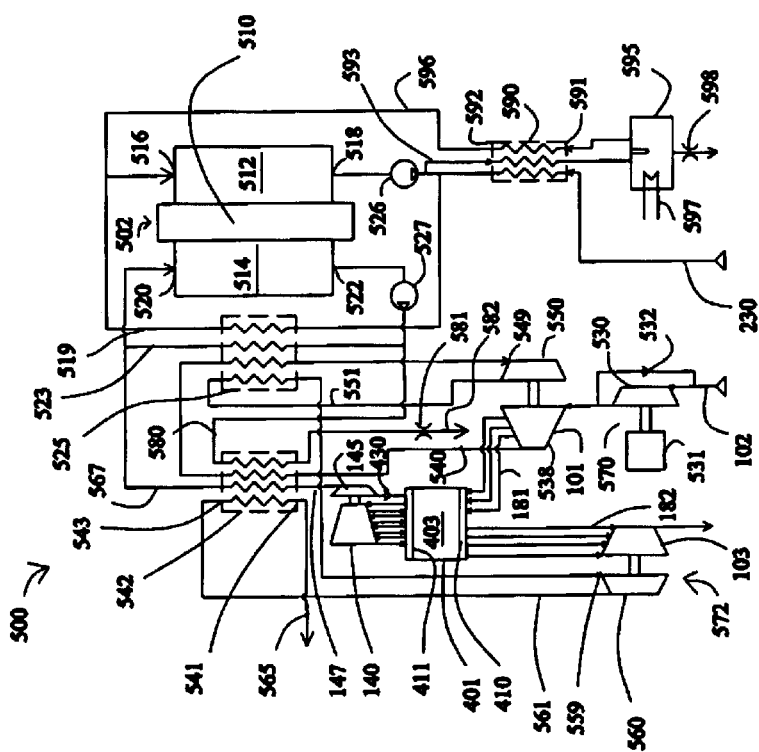

FIG. 12 shows a simplified schematic of an example of an SOFC system embodiment 500 to which externally generated and purified hydrogen is provided by fuel inlet 230. Embodiment 500 illustrates an oxygen VPSA whose compression machinery is primarily powered by free rotor gas turbines (turbochargers) recovering fuel cell stack waste heat as a thermal bottoming cycle used only to power system auxiliary compression loads. Enriched oxygen may alternatively be delivered by a positive pressure PSA process as illustrated in FIG. 4A.

Solid oxide fuel cell stack 502 includes a solid oxide electrolyte membrane 510 interposed between anode channel 512 and cathode channel 514. The anode channel has an inlet 516 and an outlet 518 connected by anode loop 519, while the cathode channel 514 has an inlet 520 and an outlet 522 connected by cathode loop 523. The anode and cathode loops pass through a heat exchanger 525 to reject stack waste heat at substantially the fuel cell working temperature. Recirculation blowers (or ejectors) 526 and 527 may be provided to generate recirculation flow in the anode and cathode loops respectively, if recirculation is desired.

The oxygen VPSA compression machinery functions are as depicted in FIGS. 4B and 5A, with variations as described below. A feed blower 530 delivers feed air to the inlet of split stream feed compressor 101. Blower 530 is powered by an electrical motor (or internal combustion engine) 531, as required to start the turbines which power compressor 101 and vacuum pump 103. A bypass non-return valve 532 is provided so that blower 530 may be stopped if desired, once the system 500 has been fully started and is up to working temperature.

Feed compressor 101 includes low pressure stages delivering feed air to the oxygen VPSA module 401 e.g. by conduit 181 as shown in FIGS. 4A or 4B, plus a higher pressure stage 538 which delivers additional compressed air as heat recovery working fluid by conduit 540 to the first end 541 of a first thermal recuperator 542 which also has a second end 543 at a temperature approaching the working temperature of the fuel cell stack. The heat recovery working fluid is heated in recuperator 542 and then by heat exchanger 525 before being delivered to the inlet 549 of a first expander turbine 550. After expansion in first turbine 550, the heat recovery working fluid is conveyed by conduit 551 to be reheated in heat exchanger 525 before being delivered to the inlet 559 of a second expander turbine 560. After expansion to substantially atmospheric pressure in second turbine 560, the heat recovery working fluid is conveyed by conduit 561 through recuperator 542 where its remaining sensible heat is recovered for preheating air in conduit 540 and enriched oxygen in conduit 567, and then the spent heat recovery working fluid is discharged by conduit 565.

In the example of FIG. 12, first turbine 550 is used to drive feed compressor 101 in a turbocharger 570, and second turbine 560 is used to drive vacuum pump 103 in a turbocharger 572. It will be evident that this use of the first and second turbines could be reversed, and also that an electrical generator may also be connected to either turbine or to a third turbine. Also, the turbines may be supplied with the heat recovery working fluid in parallel rather than in series. Operation in series with reheat is thermodynamically more efficient. Intercooling may also be provided between stages of the feed compressor 101.

Enriched oxygen from the VPSA unit 401 is delivered through non-return valve 430 to an oxygen compressor 145 to boost the pressure of the enriched oxygen to substantially the working pressure of the cathode loop channel 514. According to the working pressure selected, compressor 145 may include several stages, and the stages may be powered by any suitable motor or other drive means. FIG. 12 shows a light reflux expander turbine 140 as the power source for oxygen compressor 145 as shown in FIG. 5A. This arrangement achieves highest energy efficiency by recovering energy from the pressure letdown of the light reflux gas, and has the advantage that the oxygen compressor 145 is driven by an oxygen expander 140 in a free rotor assembly which may be hermetically enclosed. For high working pressures (e.g. >5 bars) it may be necessary to provide additional oxygen compression stages with a power source different or supplementary to light reflux expansion.

As the enriched oxygen delivered by simple VPSA systems typically contains about 5% argon and some minor amount of nitrogen impurity, it may be useful to remove a purge stream from the cathode loop 523 by a purge conduit 580. Purge conduit 580 passes through recuperator 542 for recovery of sensible heat energy from the purge stream, and includes a throttle valve 581 or other means for pressure letdown before reaching the purge discharge port 582. If desired, all or a portion of the purge may be discharged to ambient, or alternatively all or a portion of the purge may be recycled from port 582 to a feed pressurization compartment of the VPSA unit 401 in order to retain enriched oxygen and also for recovery of compression energy in the VPSA process. The fractional amount of the purge stream to be recycled into the VPSA unit will depend on optimisation analysis to determine the allowable accumulation of recycled argon impurity within the cathode loop. With purge recycle, moderately concentrated argon may be recovered as a commercially useful by product of the power plant 500.

A second thermal recuperator 590 may be provided for preheating hydrogen fuel delivered to the anode side at substantially the anode channel working pressure by fuel inlet 230. First end 591 of recuperator 590 may be at substantially ambient temperature (or at a temperature at which hydrogen is stored). Second end 592 of recuperator 590 is at substantially the stack working temperature. In order to prevent undesirable accumulation of water vapor as the product of the fuel cell reaction in the anode channel, a fraction of recirculated anode gas is diverted through a condensation loop including a cooling conduit 593 through recuperator 590 to condenser 595 and a reheating conduit 596 through recuperator 590 back to the anode inlet 516. A cooling coil 597 and a liquid water discharge throttle valve 598 are included in condenser 595.

It will be evident from consideration of FIG. 12 that the oxygen VPSA unit and the associated compression machinery provided therein as free rotor "turbocharger" machines for fuel cell stack waste heat recovery may also be applied to MCFC systems, subject to a stream of concentrated $CO_2$ also being supplied to the cathode loop so that two moles of $CO_2$ are available for each mole of O2 consumed in the MCFC cathode reaction.

Figure 13:
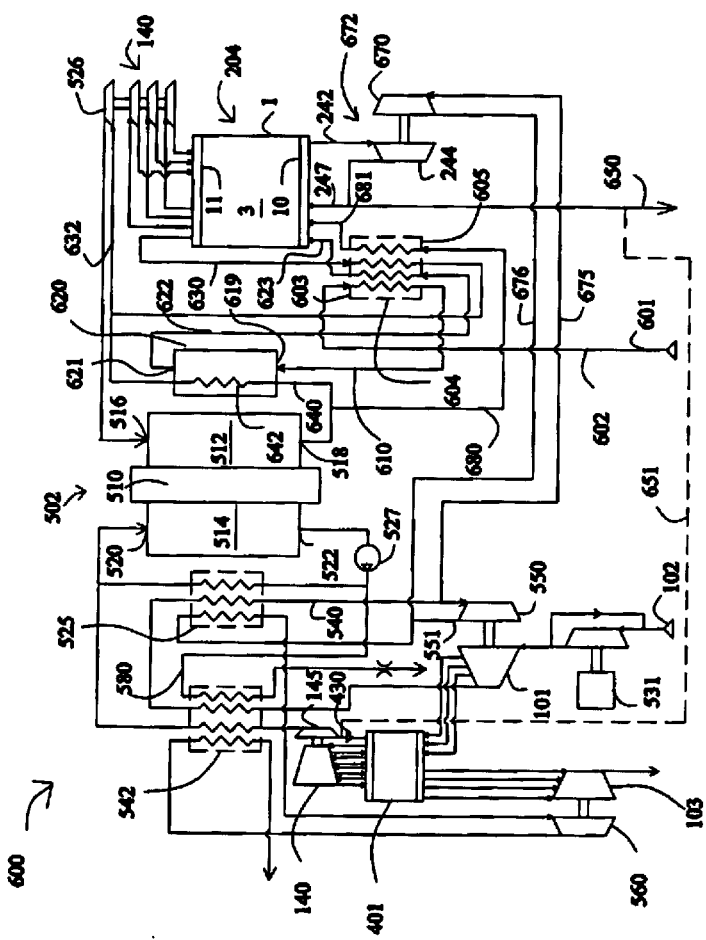
Figure 14:
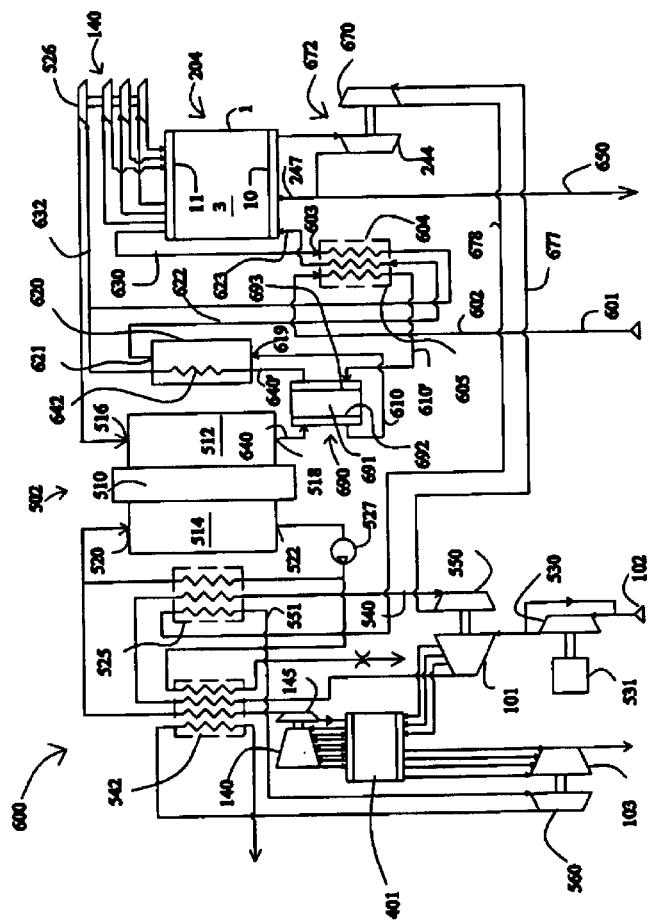

FIGS. 13 and 14 show SOFC embodiments 600 with steam reformed natural gas fuelling. Desulphurized natural gas is introduced at substantially the fuel cell working pressure to inlet 601, and thence by conduit 602 to first end 603 of reformer thermal recuperator 604, which preheats the natural gas feed as it flows to the second end 605 of the reformer recuperator. Second end 605 is at an elevated temperature approaching the fuel cell stack working temperature. The preheated natural gas flows by conduit 610 from the second end 605 of the reformer recuperator to inlet 619 of reformer reactor 620. The natural gas reacts with steam in reactor 620 to produce syngas containing hydrogen, carbon monoxide and carbon dioxide; and some of the carbon monoxide may further react with steam to produce more hydrogen.

The syngas generated in reactor 620 is delivered from exit 621 thereof by conduit 622 back through the reformer recuperator (or a portion thereof) to cool the syngas down to the working temperature of the first PSA unit (for carbon dioxide extraction from the hydrogen anode fuel), and is thence delivered by conduit 623 to a feed compartment of the first H2 PSA unit 204.

As discussed above, the working temperature of the first PSA unit 204 may be close to that of the fuel cell stack or the reformer reactor. For example, the working temperature of the H2 PSA unit may be within about 100 to about 200° C. of fuel cell stack or the reformer reactor. If the working temperature of the first PSA unit is high enough for the methane steam reforming reaction (e.g., at least about 600° C.) and a suitable catalyst is included within the adsorbers thereof, the steam reforming reaction may be conducted as sorption enhanced reaction within the PSA unit in an adsorber zone approaching or exceeding about 600° C. At somewhat lower temperatures of the first PSA unit (e.g., at least about 200° C. to about 300° C.), water gas shift may be conducted by sorption enhanced reaction over a suitable catalyst within the adsorbers. At still lower temperatures down to ambient, the first PSA unit may be operated with conventional adsorbents for adsorbing $CO_2$ from hydrogen.

Enriched hydrogen product from the first PSA unit is delivered as light product by conduit 630 to anode loop conduit 632, and thence after pressure boost by anode recirculation blower 526 to the anode inlet 516 of the fuel cell stack. Anode gas is withdrawn from anode exit 518 into conduit 640, which passes through reformer reactor heater 642 and thence to loop conduit 632.

Enriched carbon dioxide from the first PSA unit is withdrawn as heavy product at lower pressure by conduit 242 to the inlet of carbon dioxide compressor (or vacuum pump) 244 which serves as a heavy reflux compressor, and compresses the enriched carbon dioxide stream back to substantially the upper pressure of the first PSA unit cycle. A portion of the $CO_2$ is recycled back to the PSA unit by conduit 247 to a heavy reflux feed compartment of the first PSA unit. The balance of the compressed $CO_2$ is withdrawn by conduit 650 for disposal in the depicted case of a SOFC plant.

In the opposite case of a MCFC plant which may also be represented by FIG. 13, this $CO_2$ steam would be transferred by conduit 651 (shown as a dashed line in FIG. 13) for mixing into the enriched oxygen stream between non-return valve 430 and enriched oxygen compressor 145 so as to provide a suitable MCFC cathode oxidant stream with two moles of $CO_2$ for each mole of $O_2$ consumed.

The carbon dioxide compressor or heavy reflux compressor 244 is shown in FIGS. 13 and 14 as powered by a third expander turbine 670 in a free rotor "turbocharger" assembly 672. In FIG. 13, the third turbine 670 is shown in parallel operation with first turbine 550, so that the inlet conduit 675 to turbine 670 is connected to conduit 540 which is the inlet to turbine 550, and exhaust conduit 676 from turbine 670 is connected to conduit 551 which is the exhaust conduit from turbine 550.

In FIG. 14, all three turbines are operated in series for staged expansion of the heat recovery working fluid air. Conduit 540 admits heated air to the inlet of turbine 550, then conduit 677 admits the partially expanded air to the inlet of turbine 670, and conduit 678 admits the further expanded air to heat exchanger 525 for reheat and thence by conduit 551 to the inlet of turbine 560 for final expansion to atmospheric pressure. Desirably, conduit 677 would also be looped though heat exchanger 525 for reheat so that the inlet to each turbine stage is heated to the highest available temperature.

Superheating or reheating in FIGS. 13 and 14 may also be provided by an anode tail gas (or first PSA exhaust gas) combustor, which is not shown in these simplified schematics. The anode tail gas burner will not generate any NOx emissions if the oxidant is highly enriched oxygen generated by the oxygen PSA or VPSA unit 401. Since anode tail gas will be mostly $CO_2$ with very little heating value of fuel components, enriched oxygen is desirably used as the oxidant, to avoid or minimize the need for a catalyst that would be needed for combustion of such extremely low BTU gas in air.

In FIG. 13, the fuel gas in the anode channel includes hydrogen and will probably also include carbon monoxide as a fuel component, so that water vapor and carbon dioxide are continually formed as reaction products. A slipstream of anode gas is continually withdrawn from adjacent the anode exit 518 by conduit 680, and cooled through reformer recuperator 604 to the appropriate temperature for admission to a feed compartment for the first PSA unit by conduit 681. In this embodiment, the first PSA unit thus receives three feed streams in order of ascending $CO_2$ concentration: (1) the anode gas slip stream in conduit 680, (2) steam reforming reactor syngas in conduit 622, and (3) heavy reflux concentrated $CO_2$ from conduit 247. Within the PSA process, each adsorber should receive those three feed streams in the same order (from conduit 681, then conduit 623, then conduit 247), so as to maintain the correct sequence of ascending $CO_2$ concentration. Care must be taken with water vapor management in the embodiment of FIG. 13, so as to maintain an adequate steam/carbon ratio in the reformer and in the anode channel to prevent any carbon deposition and consequent catalyst deactivation. Water vapor must be supplied with or into the natural gas feed gas. It may be necessary to use a somewhat hydrophobic adsorbent in the first PSA unit, or alternatively to inject supplemental water vapor into the fuel cell anode channel. In this embodiment, the separation is less stringent, since CO need not be separated while $CO_2$ is being extracted and concentrated.

In FIG. 14, the fuel gas in the anode channel is envisaged as purified hydrogen that has been separated by the first PSA unit, here designed and operated to remove CO and CH4 impurities as well as $CO_2$. [Again, a tail gas burner may be used for combustion of residual fuel components in the PSA heavy reflux $CO_2$ enriched product stream, with the useful heat applied to preheating or reheating applications for waste heat recovery into expander turbines.] The first PSA unit of FIG. 14 receives two feed streams, the steam methane reformer reactor syngas from conduit 623, followed by the compressed heavy reflux from conduit 247, and has no recycle from the anode loop to which it delivered purified hydrogen. In this case, no $CO_2$ is formed in the anode channel, whose only reaction product is water vapor. Water vapor could be extracted from the anode loop by recuperative heat exchange to a condenser as shown in FIG. 12, but in FIG. 14 water vapor is extracted by a rotary desiccant humidity exchanger 690 coupled between conduits 610 and 640. Humidity exchanger 690 includes a desiccant wheel 691 engaged at first and second ends with valve faces 692 and 693. The humidity exchanger transfers anode product water vapor from anode exit conduit 640 to steam reforming reactor feed conduit 610, so as to remove water vapor from the anode loop while providing all of the water vapor required for steam methane reforming.

In FIG. 14, conduit 640 carries humid anode gas through valve face 692 into one side of the desiccant wheel from which dried anode gas is delivered through valve face 693 to conduit 640' connecting to anode loop conduit 632. Conduit 610 delivers humidified steam reformer feed gas through valve face 692 from the other side of the desiccant wheel to which dry preheated natural gas was feed through valve face 693 from conduit 610'. The driving force for humidity transfer may be augmented by either establishing a higher temperature in conduit 610' relative to a lower temperature in conduit 640, or by establishing a higher pressure in conduits 640 and 640' relative to a lower pressure in conduits 610' and 610.

It will be evident that there may be many other alternatives and variations of the disclosed systems and processes. For example, the disclosed systems and process can be used in connection with various fuel cells, feed gases and PSA units such as the following possibilities:

A. Direct MCFC or SOFC running on natural gas, PSA units on both anode and cathode.
B. MCFC or SOFC running on syngas generated e.g. by oxygen-blown coal gasification, PSA units on both anode and cathode.
C. Indirect SOFC running on hydrogen reformed from natural gas, PSA units on reformer (CO2 rejection), anode (H2O rejection which alternatively could be done by condensation) and cathode (nitrogen rejection).
D. SOFC running on hydrogen from any source, PSA units on anode (H2O rejection which might alternatively be done by condensation) and cathode (nitrogen rejection).

Estimated efficiencies based on fuel lower heating value are in the rough range of 60% for the MCFC embodiments, 70% for fossil fueled SOFC and 80% for hydrogen fueled SOFC at commercially attractive current densities.

For MCFC systems, the disclosed systems and process can avoid accumulation of $CO_2$ on the anode where $CO_2$ is generated by the reactions of CH4 and CO and well as by carbonate transport through the electrolyte, while also avoiding accumulation of inert nitrogen on the cathode.

A few potential advantages of certain disclosed SOFC embodiments are:

1. the problem of reduced cell voltage at extremely high temperature may be overcome by manipulating partial pressures;
2. the CO2 mass flow from anode per unit of fuel may be only about 20% as large as the $CO_2$ mass flow in an MCFC anode into which most of the $CO_2$ is delivered from the electrolyte, hence the heavy reflux compressor or vacuum pump may be much smaller and will need less power; and
3. higher grade waste heat improves efficiency of heat recovery turbochargers.

Having illustrated and described the principles of our disclosure with reference to several embodiments, it should be apparent to those of ordinary skill in the art that the invention may be modified in arrangement and detail without departing from such principles.

We claim:

1. An electrical current generating system, comprising:
   at least one fuel cell operating at a temperature of at least about 250° C.;
   at least one gas system selected from a hydrogen gas separation system or an adsorptive-enriched oxygen gas delivery system coupled to the fuel cell, the hydrogen gas separation system or adsorptive-enriched oxygen gas delivery system including at least one device selected from a compressor or pump; and
   a drive system for the compressor or pump that includes means for recovering energy from at least one of the hydrogen gas separation system, an oxygen gas delivery system, or heat of the fuel cell.

2. The system according to claim 1, wherein the fuel cell is a molten carbonate fuel cell or a solid oxide fuel cell.

3. The system according to claim 1, wherein the fuel cell is operated at a temperature of at least about 600° C.

4. The system according to claim 1, wherein the means for recovering energy comprises at least one system selected from a gas turbine, heat exchanger, or Stirling engine.

5. The system according to claim 1, wherein the pump comprises a vacuum pump.

6. The system according to claim 1, wherein the hydrogen gas separation system comprises a pressure swing adsorption module operating at a temperature greater than ambient temperature.

7. The system according to claim 1, wherein the hydrogen gas separation system comprises a pressure swing adsorption module operating at about ambient temperature to about 1000° C.

8. The system according to claim 7, wherein the pressure swing adsorption module operates at about ambient temperature to about 200° C.

9. The system according to claim 7, wherein the pressure swing adsorption module operates at about 450° C. to about 1000° C.

10. The system according to claim 7, wherein the pressure swing adsorption module operates at about 250° C. to about 800° C.

11. The system according to claim 10, wherein the pressure swing adsorption module comprises a first adsorbent and a second adsorbent.

12. The system according to claim 11, wherein the first adsorbent preferentially adsorbs carbon dioxide.

13. The system according to claim 1, wherein the hydrogen gas separation system comprises a pressure swing adsorption module operating at about 150° C. to about 800° C.

14. An electrical current generating system, comprising:
at least one fuel cell operating at a temperature of at least about 250° C.;
at least one gas system selected from a hydrogen gas separation system or an adsorptive-enriched oxygen gas delivery system coupled to the fuel cell; and
a gas turbine system coupled to the hydrogen gas separation system or adsorptive-enriched oxygen gas delivery system, wherein the gas turbine system is powered by energy recovered from at least one of the hydrogen gas separation system, an oxygen gas delivery system, or heat of the fuel cell.

15. The system according to claim 14, wherein the gas turbine system is further coupled to at least one device selected from a compressor, a pump, or an auxiliary device.

16. The system according to claim 14, wherein the hydrogen gas separation system comprises a pressure swing adsorption module operating at a temperature greater than ambient temperature.

17. An electrical current generating system, comprising:
at least one fuel cell selected from a molten carbonate fuel cell or a solid oxide fuel cell;
at least one gas system selected from a hydrogen gas separation system or an adsorptive-enriched oxygen gas delivery system coupled to the fuel cell; and
a gas turbine system coupled to the hydrogen gas separation system or adsorptive-enriched oxygen gas delivery system, wherein the gas turbine system is powered by energy recovered from at least one of the hydrogen gas separation system an oxygen gas delivery system, or heat of the fuel cell.

18. An electrical current generating system, comprising:
at least one fuel cell operating at a temperature of at least about 250° C.;
at least one gas system selected from a hydrogen gas separation system or oxygen gas separation system coupled to the fuel cell, wherein the hydrogen gas separation system can produce a first exhaust gas stream and the oxygen gas separation system can produce a second exhaust gas stream; and
a gas turbine system coupled to at least one of the hydrogen gas separation system or oxygen gas separation system, wherein the gas turbine system receives at least one of the first exhaust gas stream or second exhaust gas stream.

19. The system according to claim 18, wherein the fuel cell operates at a temperature of at least about 600° C.

20. The system according to claim 18, wherein the hydrogen gas separation system comprises a first adsorption module and the first exhaust gas stream is enriched in carbon dioxide.

21. The system according to claim 20, further comprising a combustor that defines a first inlet for receiving the first exhaust gas stream and an outlet for discharging a combustion product gas stream.

22. The system according to claim 21, further comprising a first conduit fluidly coupling the combustor outlet and a cathode inlet defined by the fuel cell, a second conduit fluidly coupling a cathode outlet defined by the fuel cell and the gas turbine system, and at least one heat exchanger housing at least a portion of the first conduit and at least a portion of the second conduit.

23. The system according to claim 21, further comprising at least one conduit fluidly coupling the combustor outlet and the gas turbine system.

24. The system according to claim 20, wherein the first adsorption module comprises a rotary pressure swing adsorption module.

25. The system according to claim 24, wherein the gas turbine system includes at least one device coupled to the rotary pressure swing adsorption module, the device being selected from a compressor and a vacuum pump.

26. The system according to claim 18, wherein the gas turbine system includes at least one device selected from a compressor and a vacuum pump.

27. An electrical current generating system, comprising:
an oxygen-containing gas source;
at least one hydrogen gas separation module that can produce a hydrogen-enriched gas stream and a carbon dioxide-enriched gas stream;
a combustion device for producing a combustion product gas stream from the oxygen-containing gas and the carbon-dioxide enriched gas stream; and
at least one molten carbonate fuel cell having a cathode inlet for receiving the combustion product gas stream and an anode inlet for receiving the hydrogen-enriched gas stream.

28. The system according to claim 27, wherein the hydrogen gas separation module comprises a pressure swing adsorption module.

29. The system according to claim 27, further comprising a pressure swing adsorption module coupled to the oxygen-containing gas source that can produce an oxygen-enriched gas stream for delivery to the combustion device.

30. The system according to claim 27, wherein the molten carbonate fuel cell has an outlet for discharging at least one fuel cell exhaust gas stream, the system further comprising a first heat exchanger that receives the fuel cell exhaust gas stream and the combustion product gas stream.

31. The system according to claim 30, further comprising a hydrogen gas-generating reactor and a conduit for delivering a hydrocarbon fuel/water mixture to the hydrogen gas-generating reactor, wherein at least a portion of the hydrocarbon fuel/water mixture conduit is disposed within the first heat exchanger.

32. The system according to claim 31, further comprising a pressure swing adsorption module coupled to the oxygen-containing gas source that can produce an oxygen-enriched gas stream for delivery to the hydrogen gas-generating reactor.

33. An electrical current generating system, comprising:
at least one fuel cell having an anode outlet for discharging an anode exhaust gas and a cathode inlet, the fuel cell operating at a temperature of at least about 250° C.;
a pressure swing adsorption module that can produce an oxygen-enriched gas stream; and
a combustion device for producing a combustion product gas stream from the oxygen-enriched gas stream and the anode exhaust gas; and
a conduit fluidly coupling the combustion device and the fuel cathode inlet for delivering the combustion product gas stream to the fuel cell cathode.

34. A process for providing at least one feed stream to at least one fuel cell operating at a temperature of at least about 250° C., comprising:
providing at least one of a hydrogen gas separation system or an adsorptive-enriched oxygen gas delivery system coupled to the fuel cell, the hydrogen gas separation system or adsorptive-enriched oxygen gas delivery system including at least one device selected from a compressor or vacuum pump;
recovering energy from at least one of the hydrogen gas separation system, an oxygen gas delivery system, or heat of the fuel cell; and operating the compressor or vacuum pump at least partially with the recovered energy to provide at least one feed stream to the fuel cell.

35. The process according to claim 34, wherein the energy recovering and operating comprise introducing at least one exhaust stream from the fuel cell, hydrogen gas separation system, or oxygen gas delivery system into at least one apparatus selected from a heat exchanger and a gas turbine.

36. The process according to claim 34, wherein the fuel cell is operated at a temperature of at least about 600° C.

37. A process according to claim 34, wherein the hydrogen gas separation system comprises a pressure swing adsorption module operating at a temperature greater than ambient temperature.

38. A process for providing at least one fuel stream to at least one fuel cell operating at a temperature of at least about 250° C., comprising:
    establishing a first pressure swing in a first fuel-containing gas stream under conditions sufficient for separating the first fuel-containing gas stream into a first fuel-enriched gas stream and a first fuel-depleted gas stream;
    introducing at least one of the first fuel-enriched gas stream or the first fuel-depleted gas stream into a first apparatus for establishing the first pressure swing; and
    introducing the first fuel-enriched gas stream into the fuel cell.

39. The process according to claim 38, wherein the first pressure swing establishing comprises pressure swing adsorption, the first fuel-containing gas stream comprises a hydrogen-containing gas stream, the fuel-enriched gas stream comprises a hydrogen-enriched gas stream, the fuel-depleted gas stream comprises a carbon dioxide-enriched gas stream, and the apparatus introducing comprises introducing the carbon dioxide-enriched gas stream into a gas turbine as a working fluid for effecting the pressure swing adsorption.

40. A process for providing an oxygen-containing gas stream and a carbon dioxide-containing gas stream to a cathode of a molten carbonate fuel cell, and a hydrogen-containing gas stream to an anode of the fuel cell, comprising:
    separating a hydrogen-containing gas stream into a hydrogen-enriched gas stream and a carbon dioxide-enriched gas stream;
    combusting a mixture of the carbon dioxide-enriched gas stream and an oxygen-containing gas stream to provide a combustion product gas stream;
    introducing the hydrogen-enriched gas stream into the fuel cell anode; and
    introducing the combustion product gas stream into the fuel cell cathode.

41. The process according to claim 40, wherein the separating occurs via pressure swing adsorption.

42. The process according to claim 40, further comprising oxygen-enriching an air feed stream to produce the oxygen-containing gas stream.

43. The process according to claim 42, wherein the oxygen-enriching comprises introducing the air feed stream into a pressure swing adsorption module to produce an oxygen-enriched gas stream.

44. The process according to claim 40, wherein the fuel cell discharges at least one fuel cell exhaust gas stream, the process further comprising transferring heat from the combustion product gas stream to the fuel cell exhaust gas stream.

45. The process according to claim 44, further comprising introducing the heated fuel cell exhaust gas stream into a gas turbine.

46. An electrical current generating system, comprising:
    at least one fuel cell operating at a temperature of at least about 250° C.;
    a fuel cell heat recovery system coupled to the fuel cell;
    at least one fuel-gas-delivery system coupled to the fuel cell; and
    a gas turbine system coupled to the fuel cell heat recovery system and the fuel-gas-delivery system.

47. The system according to claim 46, wherein the fuel cell is operated at a temperature of at least about 600° C.

48. The system according to claim 46, wherein the fuel cell heat recovery system comprises a recirculation conduit for carrying a heat recovery working fluid for transferring heat energy from the fuel cell to gas expansion energy for the gas turbine system.

49. The system according to claim 48, wherein the heat recovery working fluid is thermally coupled to a fuel cell exhaust gas stream.

50. The system according to claim 46, wherein:
    the fuel-gas-delivery system comprises a pressure swing adsorption module; and
    the gas turbine system comprises at least one pump or compressor coupled to the pressure swing adsorption module, and an expander coupled to the pump or the compressor.

51. The system according to claim 50, wherein the pressure swing adsorption module can produce an oxygen-enriched gas stream for delivery to the fuel cell.

52. The system according to claim 50, wherein there is a first pressure swing adsorption module that can produce an oxygen-enriched gas stream for delivery to the fuel cell and a second pressure swing adsorption module that can produce a hydrogen-enriched gas stream for delivery to the fuel cell.

53. An electrical current generating system, comprising:
    at least one fuel cell selected from a molten carbonate fuel cell or a solid oxide fuel cell;
    a fuel cell heat recovery system coupled to the fuel cell;
    at least one fuel-gas-delivery system coupled to the fuel cell; and
    a gas turbine system coupled to the fuel cell heat recovery system and the fuel-gas-delivery system.

54. An electrical current generating system, comprising:
    at least one fuel cell defining at least one inlet for receiving a fuel gas stream and at least one outlet for discharging a fuel cell exhaust gas stream, the fuel cell operating at a temperature of at least about 250° C.;
    at least one fuel gas delivery system for delivering the fuel gas stream to the fuel cell inlet;
    a gas turbine system coupled to the fuel gas delivery system;
    a first conduit fluidly communicating with the fuel cell outlet for carrying the fuel cell exhaust gas stream;
    a second conduit for carrying a heat recovery working fluid and fluidly coupled to the gas turbine system; and
    a first heat exchanger housing a first portion of the first conduit and a first portion of the second conduit.

55. The system according to claim 54, wherein the fuel cell is operated at a temperature of at least about 600° C.

56. The system according to claim 54, wherein:
    the fuel gas delivery system comprises a pressure swing adsorption module that can produce an oxygen-enriched gas stream for delivery to a fuel cell cathode inlet; and
    the gas turbine system comprises at least one pump or compressor coupled to the pressure swing adsorption module, and an expander coupled to the pump or the compressor, the expander defining an inlet for receiving the heat recovery working fluid.

57. The system according to claim 56, wherein the electrical current generating system further comprises an air source for delivering air to the pressure swing adsorption module and to the second conduit as the heat recovery working fluid.

58. The system according to claim 56, wherein the pump comprises a vacuum pump for extracting an oxygen-depleted gas stream from the pressure swing adsorption module and the fuel cell is operated at a temperature of at least about 600° C.

59. The system according to claim 54, wherein the first conduit and the second conduit are proximally disposed within the heat exchanger such that heat is transferred from the cathode exhaust gas in the first conduit to the heat recovery working fluid in the second conduit.

60. The system according to claim 59, further comprising a third conduit fluidly communicating with the hydrogen gas generating system inlet that can carry the hydrocarbon fuel, a fourth conduit fluidly communicating between the hydrogen gas generating system outlet and an inlet defined in the pressure swing adsorption module for receiving the hydrogen-containing gas feed stream, and a second heat exchanger housing a portion of the third conduit and the fourth conduit, wherein the third conduit and the fourth conduit are proximally positioned such that heat is transferred from the hydrogen-containing gas feed stream in the fourth conduit to the hydrocarbon fuel in the third conduit.

61. The system according to claim 54, wherein:
the fuel gas delivery system comprises a pressure swing adsorption module that can produce a hydrogen-enriched gas stream for delivering to a fuel cell anode inlet; and
the gas turbine system comprises at least one pump or compressor coupled to the pressure swing adsorption module, and an expander coupled to the pump or the compressor, the expander defining an inlet for receiving the heat recovery working fluid.

62. The system according to claim 61, further comprising a hydrogen gas generating system coupled to the pressure swing adsorption module, the hydrogen gas generating system defining an outlet for delivering a hydrogen-containing gas feed stream to the pressure swing adsorption module and an inlet for receiving a hydrocarbon fuel.

63. The system according to claim 54, wherein the fuel cell defines a first outlet for discharging a cathode exhaust gas stream and a second outlet for discharging an anode exhaust gas stream, and the first conduit carries the cathode exhaust stream, the electrical current generating system further comprising a third conduit that carries the anode exhaust gas system, a portion of the third conduit being housed in the first heat exchanger.

64. The system according to claim 54, further comprising at least one second heat exchanger housing a second portion of the first conduit and the second conduit, and wherein the gas turbine system includes at least two expander turbines and the second conduit fluidly communicates between the first heat exchanger, the second heat exchanger, and the two expander turbines.

65. The system according to claim 54, wherein:
the fuel cell comprises a solid oxide fuel cell or a molten carbonate fuel cell;
the fuel gas delivery system comprises a first rotary pressure swing adsorption module for delivering an oxygen-enriched gas stream to a fuel cell cathode inlet and a second rotary pressure swing adsorption module for delivering a hydrogen-enriched gas stream to a fuel cell anode inlet; and
the gas turbine system is coupled to the first rotary pressure swing adsorption module and the second rotary pressure swing adsorption module.

66. The system according to claim 54, wherein the fuel gas delivery system comprises a gas separation module that can produce a fuel-enriched gas stream for delivering to the fuel cell inlet.

67. A process for providing at least one fuel-enriched gas stream to at least one fuel cell operating at a temperature of at least about 250° C., comprising:
establishing a pressure swing in a fuel-containing gas stream under conditions sufficient for separating a fuel-enriched gas stream from the fuel-containing gas stream;
introducing the fuel-enriched gas stream into a fuel cell;
transferring heat from the fuel cell to a heat recovery working fluid; and
introducing the heat recovery working fluid into at least one compressor or pump for establishing the pressure swing.

68. The process according to claim 67, wherein the pressure swing establishing comprises pressure swing adsorption, the fuel-containing gas stream comprises air, the fuel-enriched gas stream comprises an oxygen-enriched gas stream, and the compressor or pump comprises a gas turbine.

69. The process according to claim 68, wherein the heat recovery working fluid expands during introduction into the gas turbine to power a compressor or pump that generates the pressure swing.

70. The process according to claim 67, wherein the heat transferring comprises transferring heat from at least one fuel cell gas exhaust stream to the heat recovery working fluid.

71. A process for providing at least one fuel-enriched gas stream to at least one of a molten carbonate fuel cell and a solid oxide fuel cell, comprising:
establishing a pressure swing in a fuel-containing gas stream under conditions sufficient for separating a fuel-enriched gas stream from the fuel-containing gas stream;
introducing the fuel-enriched gas stream into a fuel cell;
transferring heat from the fuel cell to a heat recovery working fluid; and
introducing the heat recovery working-fluid into at least one compressor or pump for establishing the pressure swing.

72. A process for providing an oxygen-enriched gas stream to at least one of a molten carbonate fuel cell or a solid oxide fuel cell, comprising:
providing a first pressure swing adsorption module that can produce an oxygen-enriched gas stream for delivering to the fuel cell;
providing a gas turbine system coupled to the first pressure swing adsorption module; and
circulating a heat recovery working fluid stream through the gas turbine system, wherein a portion of the heat recovery working fluid stream is juxtaposed with at least one fuel cell exhaust gas stream.

73. The process according to claim 72, wherein the gas turbine system comprises at least one expander coupled to a compressor or pump, and the heat recovery working fluid is introduced into the expander.

74. The process according to claim 72, further comprising heating the oxygen-enriched gas stream prior to delivery to the fuel cell by juxtaposing a portion of the oxygen-enriched gas stream with at least one of the heat recovery working fluid stream and fuel cell exhaust gas stream.

75. The process according to claim 72, further comprising providing a second pressure swing adsorption module that can produce a hydrogen-enriched gas stream for delivering to the fuel cell, wherein the gas turbine system is further coupled to the second pressure swing adsorption module.

76. An electrical current generating system, comprising:
at least one of a molten carbonate fuel cell or a solid oxide fuel cell; and
a pressure swing adsorption module coupled to the fuel cell that can produce a hydrogen-containing gas for delivery to the fuel cell, the pressure swing adsorption module including a first adsorbent and at least one second material selected from a second adsorbent and a steam reforming catalyst or water gas shift reaction catalyst.

77. The system according to claim 76, wherein the first adsorbent preferentially adsorbs carbon dioxide compared to water vapor.

78. The system according to claim 77, wherein the pressure swing adsorption module includes at least one first zone and at least one second zone, the first zone including the first adsorbent.

79. The system according to claim 78, wherein the first adsorbent comprises an alkali-promoted material and the catalyst comprises a Cu-ZnO catalyst, a transition metal carbonyl complex catalyst, or a catalyst comprising a transition group metal inserted into a zeolite cage.

80. The system according to claim 79, wherein the alkali-promoted material is selected from alumina impregnated with potassium carbonate, hydrotalcite promoted with potassium carbonate, and mixtures thereof.

81. The system according to claim 78, further comprising a third zone that includes at least one desiccant.

82. The system according to claim 77, wherein the catalyst is included in at least one of the first or second zone.

83. An electrical current generating system, comprising:
at least one fuel cell operating at a temperature of at least about 250° C.;
at least one gas system selected from a hydrogen gas separation system or oxygen gas delivery system coupled to the fuel cell, the hydrogen gas separation system or oxygen gas delivery system including a pressure swing adsorption module and at least one device selected from a compressor or pump; and
a drive system for the compressor or pump that includes means for recovering energy from at least one of the hydrogen gas separation system, oxygen gas delivery system, or heat of the fuel cell.

84. A process for providing at least one feed stream to at least one fuel cell operating at a temperature of at least about 250° C., comprising:
providing at least one of a hydrogen gas separation system or oxygen gas delivery system coupled to the fuel cell, the hydrogen gas separation system or oxygen gas delivery system including a pressure swing adsorption module and at least one device selected from a compressor or vacuum pump;
recovering energy from at least one of the hydrogen gas separation system, oxygen gas delivery system, or heat of the fuel cell; and
operating the compressor or vacuum pump at least partially with the recovered energy to provide at least one feed stream to the fuel cell.

85. An electrical current generating system, comprising:
at least one fuel cell operating at a temperature of at least about 250° C.;
at least one gas system selected from a hydrogen gas separation system or oxygen gas delivery system coupled to the fuel cell, wherein the hydrogen gas separation system or the oxygen gas delivery system includes a pressure swing adsorption module; and
a gas turbine system coupled to the hydrogen gas separation system or oxygen gas delivery system, wherein the gas turbine system is powered by energy recovered from at least one of the hydrogen gas separation system, oxygen gas delivery system, or heat of the fuel cell.

86. The system according to claim 85, wherein the pressure swing adsorption module can deliver a hydrogen-containing gas to the fuel cell, the pressure swing adsorption module including a first adsorbent and at least one second material selected from a second adsorbent, a steam reforming catalyst, or a water gas shift reaction catalyst.

87. The system according to claim 86, wherein the first adsorbent preferentially adsorbs carbon dioxide compared to water vapor.

88. The system according to claim 87, wherein the first adsorbent comprises an alkali-promoted material and the catalyst comprises a Cu-ZnO catalyst, a transition metal carbonyl complex catalyst, or a catalyst comprising a transition group metal inserted into a zeolite cage.

89. An electrical current generating system, comprising:
a molten carbonate fuel cell; and
a pressure swing adsorption module coupled to the molten carbonate fuel cell that can produce a hydrogen-containing gas for delivery to the molten carbonate fuel cell, the pressure swing adsorption module including a first adsorbent and at least one second material selected from a second adsorbent and a steam reforming catalyst or water gas shift reaction catalyst.

90. The system according to claim 89, wherein the first adsorbent preferentially adsorbs carbon dioxide compared to water vapor.

91. The system according to claim 89, wherein the pressure swing adsorption module includes at least one first zone and at least one second zone, the first zone including the first adsorbent.

92. An electrical current generating system, comprising:
at least one of a molten carbonate fuel cell or a solid oxide fuel cell; and
a pressure swing adsorption module coupled to the fuel cell that can produce a hydrogen-containing gas for delivery to the fuel cell, the pressure swing adsorption module including a first adsorbent and at least one second material selected from a second adsorbent and a steam reforming catalyst or water gas shift reaction catalyst,
wherein the first adsorbent is disposed in a first zone and the second material is disposed in a second zone, the first zone and the second zone being disposed adjacently along a hydrogen-containing gas flow path defined in the pressure swing adsorption module.

* * * * *